United States Patent
Steenhagen et al.

(10) Patent No.: US 7,434,205 B1
(45) Date of Patent: Oct. 7, 2008

(54) VIRTUAL TYPE INTERPRETATION, INTERACTION AND DETECTION

(76) Inventors: Shawn K. Steenhagen, 1017 N. Parkview St., Cottage Grove, WI (US) 53527; Jerry J. Trantow, 4318 Fawn Ct., Cross Plains, WI (US) 53528; Mark C. Allie, 756 Nottingham Rd., Stoughton, WI (US) 53589

( * ) Notice: Subject to any disclaimer, the term of this patent is extended or adjusted under 35 U.S.C. 154(b) by 512 days.

(21) Appl. No.: 11/061,113

(22) Filed: Feb. 18, 2005

Related U.S. Application Data

(60) Provisional application No. 60/546,450, filed on Feb. 19, 2004.

(51) Int. Cl.
G06F 9/44 (2006.01)

(52) U.S. Cl. ............... 717/124; 717/105; 717/113; 717/117

(58) Field of Classification Search .......... 717/100–135
See application file for complete search history.

(56) References Cited

U.S. PATENT DOCUMENTS

| | | | | |
|---|---|---|---|---|
| 5,228,039 A | 7/1993 | Knoke | | 371/19 |
| 5,479,652 A | 12/1995 | Dreyer | | 395/183.06 |
| 5,488,688 A | 1/1996 | Gonzales | | 395/183.1 |
| 5,524,244 A | 6/1996 | Robinson | | 395/700 |
| 5,557,557 A | 9/1996 | Frantz | | 364/578 |
| 5,590,354 A | 12/1996 | Klapproth | | 395/800 |
| 5,768,152 A | 6/1998 | Battaline | | 364/551.01 |
| 5,771,240 A | 6/1998 | Tobin | | 371/22.1 |
| 5,828,824 A | 10/1998 | Swoboda | | 395/183.01 |
| 5,884,023 A | 3/1999 | Swoboda | | 395/183.06 |
| 5,933,641 A | 8/1999 | Ma | | 395/705 |
| 5,941,991 A | 8/1999 | Kageshima | | 713/340 |
| 5,950,000 A | 9/1999 | O'Leary | | 395/701 |
| 5,968,188 A | 10/1999 | Rana | | 714/29 |
| 5,983,017 A | 11/1999 | Kemp | | 395/704 |
| 6,041,406 A | 3/2000 | Mann | | 712/227 |
| 6,079,032 A | 6/2000 | Peri | | 714/38 |
| 6,185,732 B1 | 2/2001 | Mann | | 717/4 |
| 6,240,549 B1 | 5/2001 | Hamada | | 717/5 |
| 6,249,909 B1 | 6/2001 | Russo | | 717/9 |
| 6,311,292 B1 | 10/2001 | Choquette | | 714/30 |
| 6,327,703 B1 * | 12/2001 | O'Donnell et al. | | 717/162 |
| 6,338,025 B1 | 1/2002 | Bowen | | 702/60 |
| 6,493,868 B1 | 12/2002 | DaSilva | | 717/105 |
| 6,543,048 B1 | 4/2003 | Kuzemchak | | 717/127 |
| 6,553,502 B1 | 4/2003 | Hurd | | 713/320 |
| 7,107,578 B1 * | 9/2006 | Alpern | | 717/124 |
| 2001/0042069 A1 * | 11/2001 | Petrov et al. | | 707/103 Y |
| 2002/0129337 A1 * | 9/2002 | Evans et al. | | 717/124 |
| 2003/0115584 A1 * | 6/2003 | Fahs et al. | | 717/158 |
| 2003/0145310 A1 * | 7/2003 | Thames et al. | | 717/123 |

(Continued)

OTHER PUBLICATIONS

Presence in virtual environments as a function of visual and auditory cues, Hendrix, C.; Barfield, W., Virtual Reality Annual International Symposium, 1995. Proceedings, Mar. 11-15, 1995, IEEE, pp. 74-82.*

(Continued)

*Primary Examiner*—Wei Y. Zhen
*Assistant Examiner*—Satish S Rampuria

(57) ABSTRACT

Interpretation of virtual types in a software development, debugging, or monitoring environment. Display and modification of variables having virtual types. Detection of virtual types.

20 Claims, 33 Drawing Sheets

U.S. PATENT DOCUMENTS

| | | | |
|---|---|---|---|
| 2004/0003385 A1* | 1/2004 | Kushlis | 717/158 |
| 2004/0158812 A1* | 8/2004 | Dye et al. | 717/105 |
| 2006/0064673 A1* | 3/2006 | Rogers et al. | 717/113 |
| 2006/0143570 A1* | 6/2006 | Washington et al. | 715/763 |

OTHER PUBLICATIONS

Virtual Data Visualizer, van Teylingen, R.; Ribarsky, W.; van der Mast, C., Transactions on Visualization and Computer Graphics, vol. 3 Issue: 1 Jan.-Mar. 1997, IEEE, pp. 65-74.*

The general variables concept: a simple step from single- to multi-user environment, Masa, M.; Zara, J.; 2001, IEEE, pp. 584-588.*

An object oriented model of behavior encoded virtual tools, Kesavadas, T.; Subramanium, H.V., 1998 IEEE, vol. 1, pp. 338-343.*

Stevenson, "Texas Instruments Application Report, Q-Values in the Watch Window," literature No. SPRU321, Feb. 2002.

Code Composer Studio Application Programming Interface (API) Reference Guide (Texas Instruments literature No. SPRU321) (Oct. 2001).

Code Composer Studio Software Developer's Kit User's Guide (Texas Instruments literature No. SPRU320) (Oct. 2001).

Siegel, CORBA Fundamentals and Programming, (John Wiley & Sons 1996).

Chappell, Understanding ActiveX and OLE, (Microsoft Press 1996).

Brockschmidt, Inside OLE (2d ed. Microsoft Press 1995).

Denning, OLE Controls Inside Out (Microsoft 1995).

IQ Math Library, Module User's Guide v. 1.4.1 (Texas Instruments, Jun. 2002).

* cited by examiner

```
bcd:  bcd_long, long_bcd
Q0:   q0
Q1:   q1, q1_int
Q2:   q2
Q15:  q15, int16, int_q15
```

*Figure 10a*

```
bcd:  bcd*, *_bcd, *_bcd_*
Q0:   q0*, *_q0
Q1:   q1*
Q2:   q2*, *_q2_*
Q15:  q15*
```

*Figure 10b*

```
OnNewFloatValueEntered(float_entered_value)
{
Raw_value = Round(float_entered_value*2^Qval.)          //L-10
Nbits = GetNumBitsofNativeType(VarString)               //L-20
If (Raw_value > 0)                                      //L-30
        Raw_value = min(raw_value, (2^(Nbits-1) -1))    //L-31
Else                                                    //L-32
        Raw_value = max(raw_value, -2^(Nbits)           //L-33
Endif                                                   //L-34
WriteValueToTarget(MemAddress(VarString), raw_value)    //L-40
Display_val = raw_value/2^Qval                          //L-50
UpdateValueDisplayFields(display_val,raw_value);        //L-60
}
```

*Figure 18*

```
// Q-type type defs
typedef int q15;    /* range [-1.0 1.0), precision of 0.000030517578125.*/
typedef int q14;    /* range [-2.0 2.0) */
typedef int q13;    /* range [-4.0 4.0) */
// etc...
typedef int q0;     /* range [-32768 32767) */
typedef int qx;     /* generic Q type */

// long Q-type type defs
typedef long q31;
typedef long q30;        /* range [-2.0 2.0) */
typedef long q29;        /* range [-4.0 4.0) */
//etc.
```

*Figure 21*

```
#QGENERIC:   qx,qy,qz
#GLOBAL_Q:   _iq
0:   q0;
.
.
.
9:   q9,sq9,q9_16;
10:  q10;
11:  q11,q11_16;
12:  q12,  sfract3_12;
13:  q13;
14:  q14;
15:  q15,int16,int_q15;
```

*Figure 22*

```
// Set the default Q values
#define QGENERIC     (15)
#define GLOBAL_Q     (12)

int    GlobalQ=GLOBAL_Q     // tells the TI CCS Gel Files the default Q type.

// variable declarations
q0     q0_a       =100;
q8     q8_a       =Q8(97.543);
q10    the_a_var  =Q10(17.23551);
qx     g_var_1;
_iq    g_var_2;

// change the default Q value in the middle of the file:
#define GLOBAL_Q     (10)
int        q14_by_name;
_iq        g_var_3;
qx         g_var_4;
```

Figure 23

| variable string | associated Q value |
|---|---|
| q0_a | 0 |
| q8_a | 8 |
| the_a_var | 10 |
| g_var_1 | 15 |
| g_var_2 | 12 |
| q14_by_name | 14 |
| g_var_3 | 10 |
| g_var_4 | 15 |

*Figure 24*

```
//
// Pseudo Code that shows the symbol table management aspects of the build all operation
//
BUILD_ALL_OPERATION(theQObjFile, theSourceFileList)
{
    // theQObjFile is the global object file to be updated
    // theSourceFileList is a list of all project source files to be scanned.

// extract the dynamic section from the Qobject file
    myDynamicSection = GetDynamicSection(theQObjFile);

// create a new static section
    myStaticSection = ScanAllSourceFilesAndCreateMergedSymTable(theSourceFileList);

// now clear any duplicate entries from the dynamic section
    For Each Entry of myDynamicSection
    {
        if (Exact match of Entry found in myStaticSection)
        {
            Remove that Entry From myDynamicSection;
        }
    }

// Now clear out and write both sections to the Q-Object file
    ClearTable(theQObjFile);
    WriteToDynamicSection(myDynamicSection);
    WriteToStaticSection(myStaticSection);
}

//
// Pseudo Code that shows symbol table management aspects of the Watch/Edit Tool
//
WATCH_EDIT_TOOL_ON_NEW_EXPRESSION_ENTERED(theExprString, theQObjFile)
{
    theEntry=FindSymbolInDynamic(theQObjFile, theExprString);
    if (theEntry is Empty)
    {
        theEntry=FindSymbolInStatic(theQObjFile, theExprString);
    } if (theEntry is Empty)
    {
        QVal=ExtractQvalFromName(theExprString);
        AddEntryToDynamic(theQObjFile,theExprString,QVal);
    }
    .
}

//
// Pseudo Code that shows symbol table management aspects of the Watch/Edit Tool
// when the Q-type is manually modified
//
WATCH_EDIT_TOOL_ON_NEW_QVAL_ENTERED(theExprString, theNewQVal,theQObjFile)
{
    // TheExprString is the variable or expression in the same row of the watch window
    // as the Qval field that was just modified by the user.

// This functionality adds or replaces the expression and new Q value to the
    // dynamic portion of the symbol table.

theEntry=FindSymbolInDynamic(theQObjFile, theExprString);
    if (theEntry is Empty)
    {
        AddEntryToDynamic(theQObjFile,theExprString,theNewQVal);
    }
    else
    {
        theEntry.Qvalue = theNewQval;
        ReplaceEntryInDynamic(theQObjFile,theEntry);
    }
}
```

*Figure 28*

VIRTUAL TYPE INTERPRETATION, INTERACTION AND DETECTION

CROSS REFERENCE TO PROVISIONAL APPLICATION

This application claims the benefit of provisional application Ser. No. 60/546,450 (entitled "Virtual Type Interpretation, Interaction, and Detection"), filed Feb. 19, 2004, and which is hereby fully incorporated by reference.

COMPUTER PROGRAM LISTING APPENDIX

Submitted as part of this disclosure are three compact discs, each containing the files listed in one of the Appendices A, B, and C. Each compact disc is submitted in duplicate. The material on these compact discs is hereby fully incorporated by reference.

BACKGROUND AND SUMMARY

For years, hardware and software design tools, including software development kits, emulators, debuggers, and other tools have incorporated various tools and features for improving the efficiency of the operation, design, test, and development process. Often, modern tools include various debugging features, including "watch" or "memory" windows to inspect and/or modify variables and memory locations within a target software application. While modern tools make the design, test, and emulation of hardware and software more efficient than ever before, various enhancements, improvements, and/or efficiencies may be desirable. This disclosure describes various implementations of methods and/or systems relating to the interpretation of, interaction with and/or detection of virtual types, as well as relating to other inventions disclosed herein.

In one embodiment, the invention relates to a method of interpreting the value of a variable having a raw or native type and a virtual type, wherein the method comprises the act of interpreting the value of the variable in a format that is consistent with its virtual type. In another embodiment, the invention relates to a system for interacting with a variable having a raw or native type. In another embodiment, the invention relates to a method of detecting the virtual type of a variable. Other embodiments, features and uses of the systems, methods, and subject matter disclosed herein may be understood by reference to the full extent of this disclosure, including the following detailed description, the claims, the appendices, and the several drawings herein.

BRIEF DESCRIPTION OF THE DRAWINGS

The following brief description of the drawings should be read and interpreted with the understanding that the Figures illustrate specific implementations of one or more of the inventions disclosed herein. These descriptions may therefore apply only to some embodiments of the inventions disclosed in this application. No part of this brief description should be interpreted as limiting the scope of any claimed invention in a manner not specifically required by the issued claims of this patent.

FIG. 10 illustrates examples of a virtual type qualifier list and a naming convention form list.

FIG. 18 is a pseudo code listing.

FIG. 21 is a C code fragment.

FIG. 22 is a sample Q-typedef qualifier list.

FIG. 23 is a C code fragment.

FIG. 24 is a table showing the Q-type associated with a list of variables.

FIG. 28 is a pseudo code listing illustrating symbol table management.

DETAILED DESCRIPTION

This application relates to a variety of inventions as disclosed herein, and should be read and interpreted with the understanding that various inventions are disclosed herein by describing, illustrating, or otherwise disclosing specific implementations of those inventions. Thus, any features, procedures, methods, systems, brief descriptions of the drawings, or other aspects described or illustrated herein are not intended to limit the scope of any claimed invention in a manner not specifically required by the issued claims of this patent.

In addition, the following disclosure should be read and interpreted as providing an adequate disclosure and written description for any single feature, procedure, method, system or other aspect of any of the disclosed subject matter, whether or not such single feature, procedure, method, system or other aspect has been described as being implemented separately. Similarly, the following disclosure should be read and interpreted as providing an adequate disclosure and written description for any partial implementation of the methods, systems, and/or apparatuses disclosed herein, whether or not such partial implementations have been specifically described or illustrated. None of the features, procedures, methods, systems, or other aspects of these specific implementations are an essential or required aspect or element of any claimed invention unless explicitly required by the claim directed to that invention. No claim should be read to include subject matter described in this detailed description unless that claim explicitly recites such subject matter. For example, although this disclosure describes embodiments relating to the interaction with and/or detection of virtual types in a software development environment, it should be understood that implementation in a software development environment is not an essential element or required aspect of any claimed invention unless explicitly required by the claim directed to that invention. Further, any other methods, techniques, contexts, or subject matter disclosed herein are not essential elements or required aspects of any claimed invention unless explicitly required by the claim directed to that invention.

Further, the following disclosure should be read and interpreted with the understanding that any feature, procedure, method, system, aspect, invention, or combination thereof that is described and/or illustrated in this disclosure may be combined with any other feature, procedure, method, system, or other aspect described and/or illustrated in this disclosure, even if such a combination is not shown or specifically described. This disclosure should be interpreted as providing an adequate disclosure and written description of any claim directed to such combinations.

Figure 1:
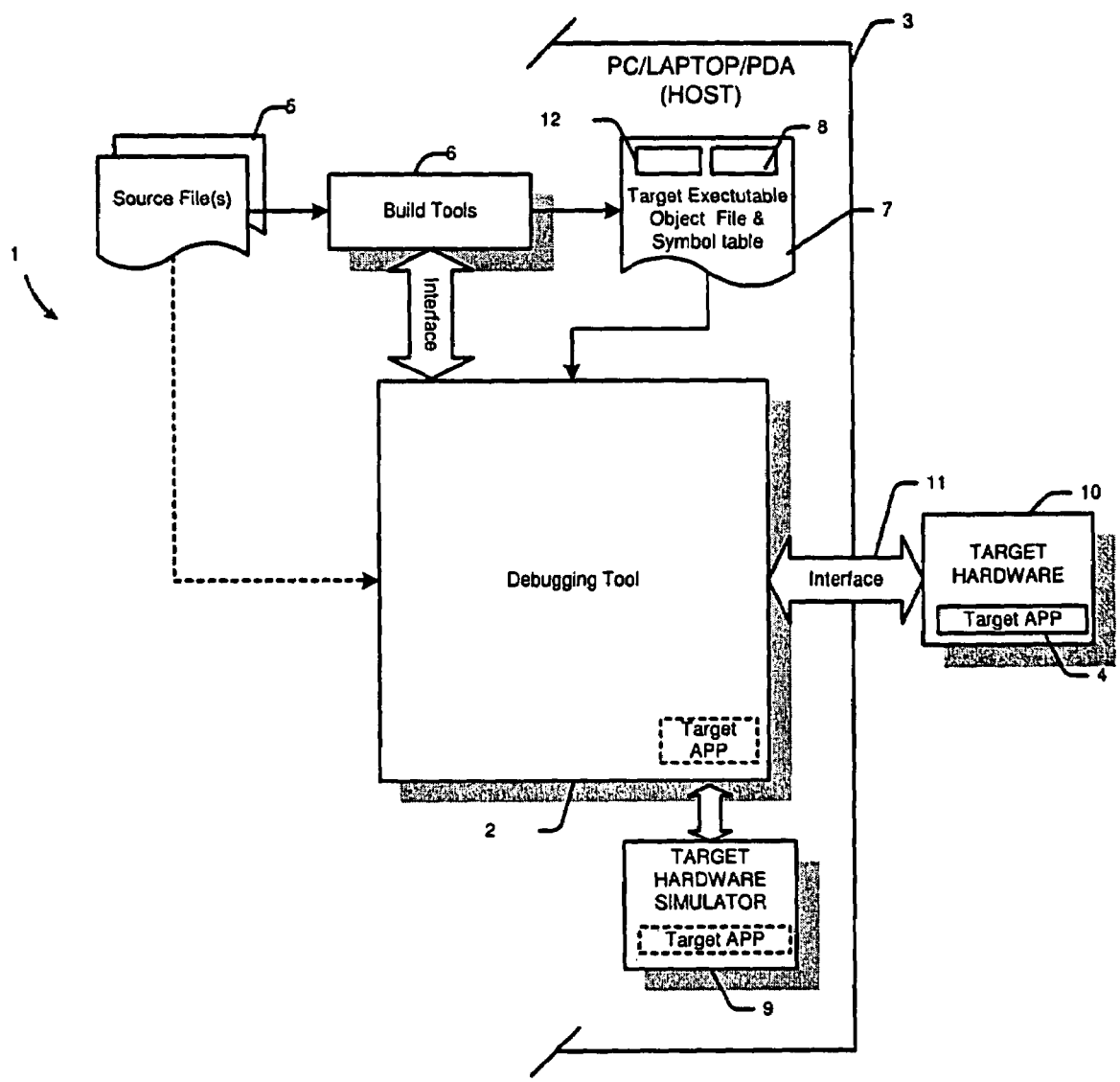
FIG. 1 is a block diagram of a software development environment.

FIG. 1 is a block diagram of a software development environment 1. In the environment 1, a debugging tool 2 running on a host computer 3 is used to inspect and or modify variables and memory locations within a target software application (4). Source files (5) specify the functionality of the target application 4 and are processed by a set of build tools 6, creating the target application executable file 7. This executable file typically contains within it a symbol table 8 which lists the names, types and size of all the variables defined by source files 5. The target application executable file 7 also includes an embedded form 12 of the target application 4.

In the embodiment shown in FIG. 1, the target application 4 runs on a separate target hardware platform 10 that employs a specific microprocessor. The target application 4 may, in other embodiments, run on the host computer 3 itself (see the dotted line representation of the target application 4 in the box 2). In still other embodiments, it may run on a device simulator 9 (see dotted line representation of the target application 4 in the box 9) or elsewhere.

The debugging tool 2 is connected to the target hardware over an interface (11) which allows communication between the host computer 3 and the target hardware 10. The debugging tool 2 reads the target executable file 7 and symbol table 8 and in some cases it downloads the target application 4 to the target hardware 10 and launches it. The debugging tool 2 may use the source files 5 when setting break points and single stepping through the target application 4. Although the debugging tool 2 is shown separated from the build tools 6 in FIG. 1, in some embodiments, the debugging tool 2 and the build tools 6 are integrated.

One popular development environment is Microsoft's Visual C++ Studio. Another software development environment is Texas Instruments Code Composer Studio which uses a scan based emulator as its primary debugging tool and which is connected to the target hardware over a JTAG interface. Another such debugging tool is Applied Signal Processing's Live Data Exchange™ which communicates with the target device over a serial link. In general, Microsoft's development tools run the target application on the host computer itself. Others, such as Texas Instruments' Code Composer Studio (described in U.S. Pat. No. 6,493,868, which is hereby fully incorporated herein by reference), help debug target code that is intended to run on a specialized microprocessor such as a Digital Signal Processor. In the case of debugging code for a specialized microprocessor, the debugging tool normally runs on a host computer and either simulates the instruction set of the specialized microprocessor or is physically connected to target hardware using the specialized microprocessor.

In some situations, it is desirable for a particular variable having a "raw" or "native" variable type, such as an "int," "char," "long" or other type, to function as the basis for one or more other types. These other types, which are based on the raw type, may be called "virtual types." When a variable has one or multiple virtual types, it may be interpreted differently, depending on its "virtual type," and have a value that is a function of the virtual type associated with the variable.

The development and debugging of computer software is one situation in which a variable's virtual type may have some significance. Most modern development and debugging tools allow a user to inspect and modify variables and memory locations within a target software application. Often, a debugging tool is provided with a "watch" or "memory" window to permit inspection and/or modification of variables and memory locations within a target software application.

Figure 2A:
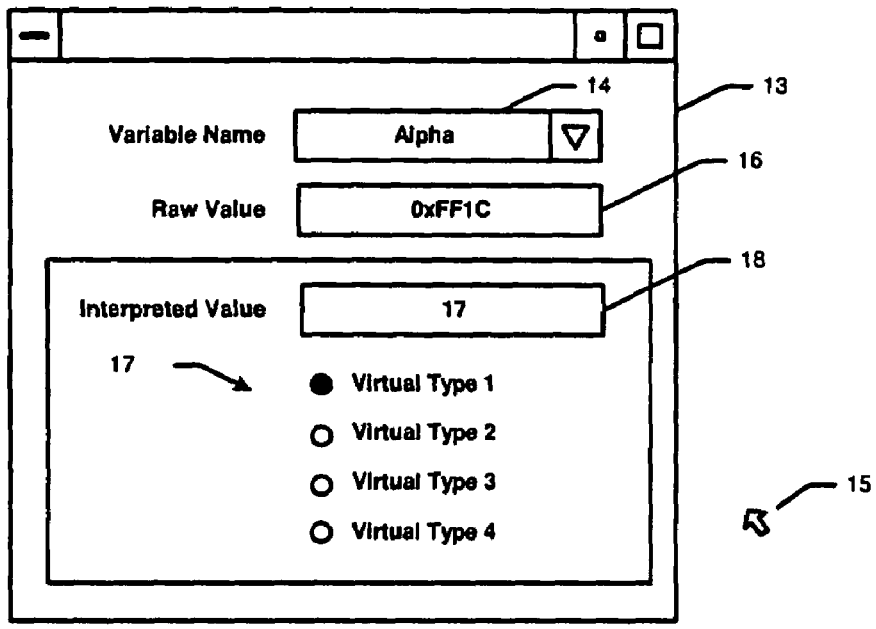
FIGS. 2a and 2b are screen displays showing a "watch"-type window.

FIG. 2a is a screen display showing a "watch"-type window 13 displaying a variable (Alpha) that can be interpreted as having different values, depending on its virtual type. A dropdown box 14 allows the user to select, using the cursor or mouse pointer 15, a variable to display, and a raw value window 16 displays the actual data that is stored in the memory location represented by variable Alpha. In this case, the raw value window 16 displays the data in hexadecimal format, but the data could be displayed in binary or other forms. A set of radio buttons 17 allow the user to select one of a choice of various virtual types. An interpreted value window 18 displays the value of the variable Alpha, as it is interpreted using the selected virtual type.

Figure 2B:
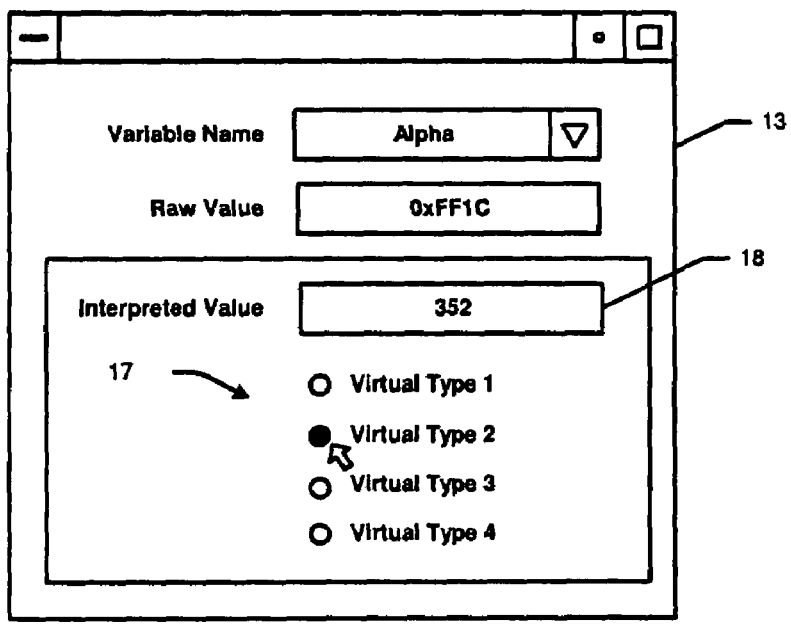

In FIG. 2a, the variable alpha is displayed in the interpreted value window 18 as having a value of 17 when it is interpreted as a "Virtual Type 1." As shown in FIG. 2b, that same variable Alpha is interpreted as having a value of 352 when interpreted as a "Virtual Type 2." Note that the data 16 stored in the memory location associated with the variable Alpha, which is a 16-bit quantity, has not changed. It has the same raw hexadecimal value in both FIG. 2a and FIG. 2b. The difference between these two Figures is that the variable is interpreted differently in FIGS. 2a and 2b, based on the change to the selected virtual type.

Figure 3A:
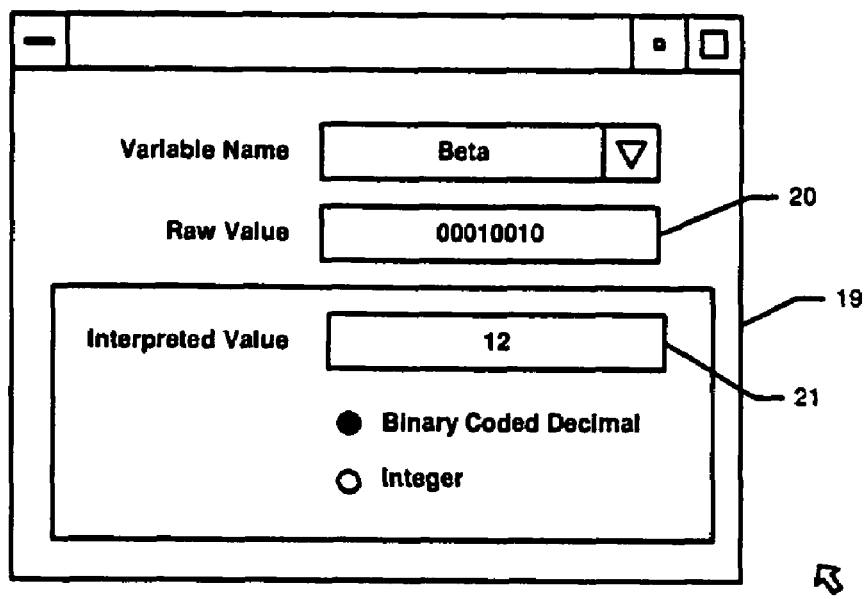
FIGS. 3a and 3b are screen displays showing a "watch"-type window.

FIG. 3 is a screen display showing a window 19 illustrating another example. In this example, the variable "Beta," which is an 8-bit quantity, can be interpreted as one of two virtual types: (1) a binary coded decimal (where two decimal digits 0 to 9 are encoded using the high-order four bit quantity, and the low-order four bit quantity), and (2) its raw type or as an "integer" having the decimal value of the binary quantity associated with the variable Beta. (Thus, in this situation, the raw type is also considered a "virtual type.") As shown in FIG. 3a, when the raw value 00010010 is interpreted as having a virtual type that is a binary coded decimal, its value is interpreted as 12 (i.e., the high-order 4-bit quantity represents a decimal "1" and the low-order 4-bit quantity represents a "2"). When interpreted as a virtual type that is an "integer," its interpreted value is 18. As in FIGS. 2a and 2b, the data stored at the memory location represented by the variable Beta has not changed, and the raw type associated with the variable has not changed, yet the variable is interpreted differently, based on the selected virtual type.

Figure 3B:
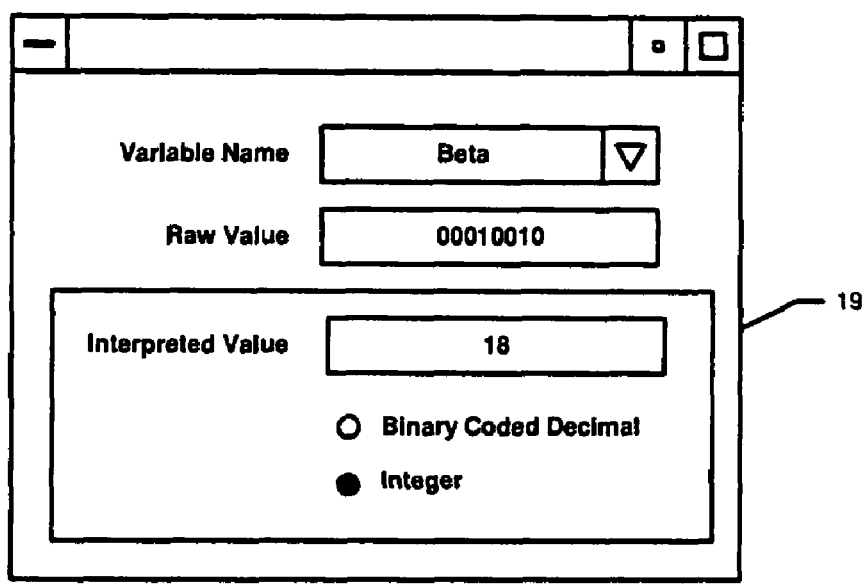

In FIG. 3a and FIG. 3b, the user can also change the raw value of the variable in window 20, which causes (1) the memory location associated with the variable Beta to be changed accordingly, and (2) the interpreted value displayed in window 21 to be updated based on the selected virtual type.

The user may also change the interpreted value of Beta in window 21, which causes the memory location associated with the Beta variable to be changed accordingly, once the translation from virtual type to raw type is performed. For example, if the interpreted value in window 21 were changed in FIG. 3a to the value 11, the memory location associated with the Beta variable would change to 00010001, since that quantity has a binary coded decimal value of "11," and the selected virtual type in FIG. 3a is "binary coded decimal."

FIG. 4 illustrates another example involving the use of virtual types based on "Q arithmetic," in which a variable having a raw type of "int" or "long" has an implied number of fractional bits. In some situations, often involving systems using specialized microprocessors such as Digital Signal Processors, particular arithmetic operations are performed a certain way so the processor can be used more efficiently. Typically, digital signal processors are low cost fixed point devices, which means that their IC design and instruction sets are designed to efficiently process fixed point operations, but they may be inefficient at performing floating point operations. For this reason, it is common to develop software applications and algorithms, especially DSP algorithms, that use only fixed point arithmetic, so as to ensure that the processor is used efficiently.

A common technique in developing fixed point algorithms is to use "Q arithmetic," where the Q-type of a variable defines the number of implied fractional binary bits within the 16-bit (or 32-bit, or other bit quantity) fixed point raw representation of a value. A Q15 virtual type number has 15 implied fractional bits. A Q8 virtual type number has 8 implied fractional bits. To convert between the raw value and the represented value of a Qval number we use the following formulas:

interpreted_value=raw_value/($2^{Qval}$)

raw_value=interpreted_value*$2^{Qval}$

For example, to represent the value 3.5 as a Q6 number in 16 bits, the raw value is 3.5*26=224=0x00E0 (hex).

Figure 4A:
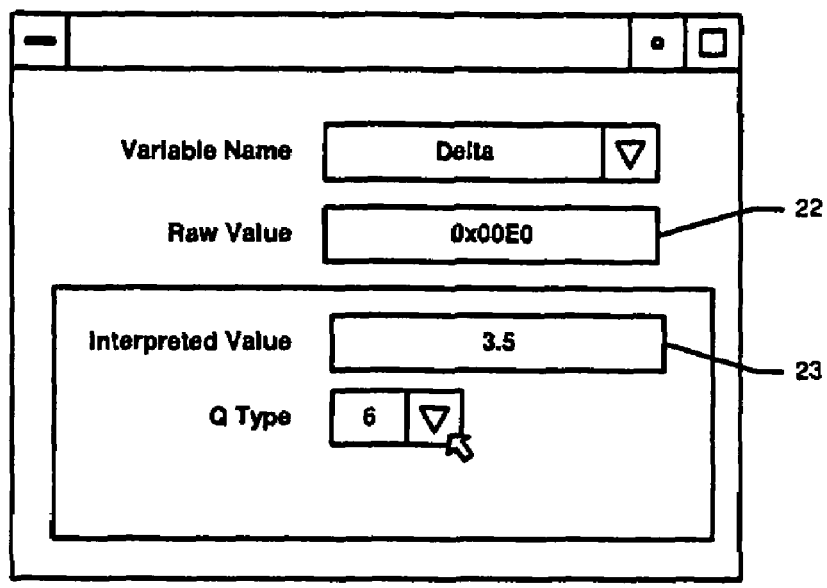
FIGS. 4a and 4b are screen displays showing a "watch"-type window.

In FIG. 4, the variable "Delta" can be interpreted according to a variety of Q-type virtual types. In FIG. 4a, the variable Delta has a 16-bit quantity 0x00E0, shown in hex format, stored at the memory location it represents (see 22), and it is interpreted as Q6 virtual type, which means that it uses 6 bits for the fractional portion of its value. Its interpreted value is 3.5, since 0x00E0=224 (integer or decimal), and $224/2^{6=3.5}$.

Figure 4B:
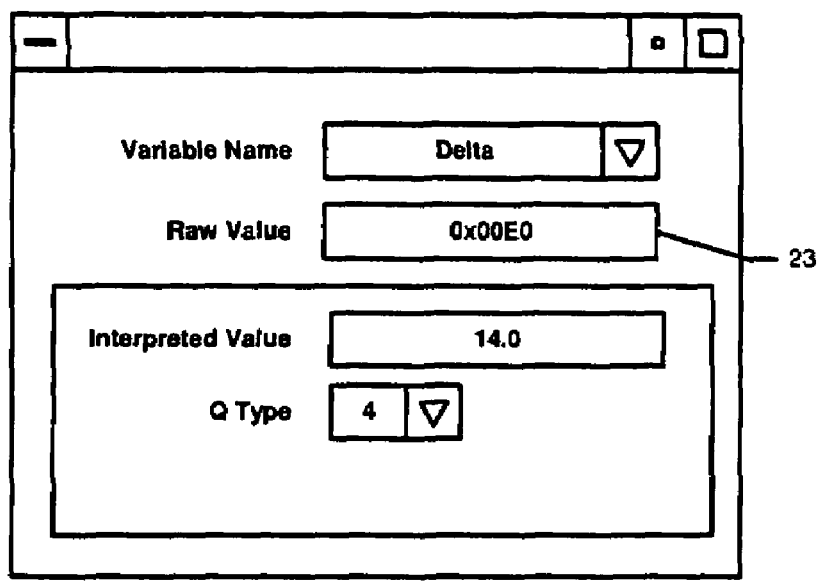

In FIG. 4b, the virtual type associated with variable Delta is changed to a Q4 type, which means that its interpreted value is $224/2^{4=14.0}$ (see 23 in FIG. 4b).

Although FIGS. 3 and 4 are described in connection with particular examples of virtual types, other virtual types taking different forms may be applicable in some embodiments. For example, some embodiments of the inventions disclosed herein may be applicable to packed vs unpacked strings (e.g., characters encoded as one byte or two bytes), radians vs. Hz virtual types (a radian variable is sometimes hard to understand without the conversion to HZ), ASCII vs. decimal virtual types (e.g., a value may be an ASCII string of numbers only), and virtual types involving quantities with encryption or check sum and parity bits (e.g., a 16-bit interpreted or real world value may be stored in a 32-bit word, with the upper 16 bits including encryption or check sum information).

Figure 5A:
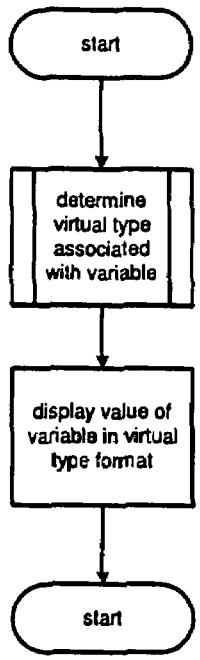
FIG. 5 is a flow chart illustrating some operations relating to a "watch"-type window.
Figure 5B:
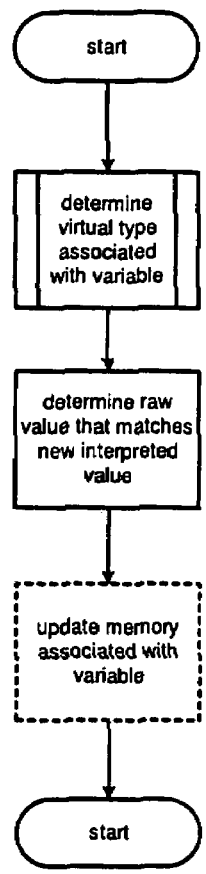
Figure 5C:
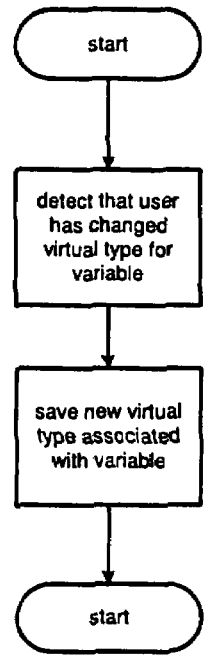

FIG. 5 is a flow chart illustrating some basic operations relating to the FIGS. 2, 3, and 4. FIG. 5a illustrates the operation of displaying a variable in its virtual type format, which involves determining the variable's virtual type. FIG. 5b illustrates the operation of changing the data associated with the variable by allowing the user to enter an interpreted value to be represented by the variable's virtual type. Once the virtual type for the variable is determined, the interpreted value is translated into a raw or binary value that matches (or best matches) the interpreted value entered by the user. The memory associated with the variable may also optionally be changed. FIG. 5c illustrates the operation of detecting that the user has changed the virtual type associated with a variable, which may prompt the new virtual type associated with the variable to be saved for later use or reference.

Figure 6:
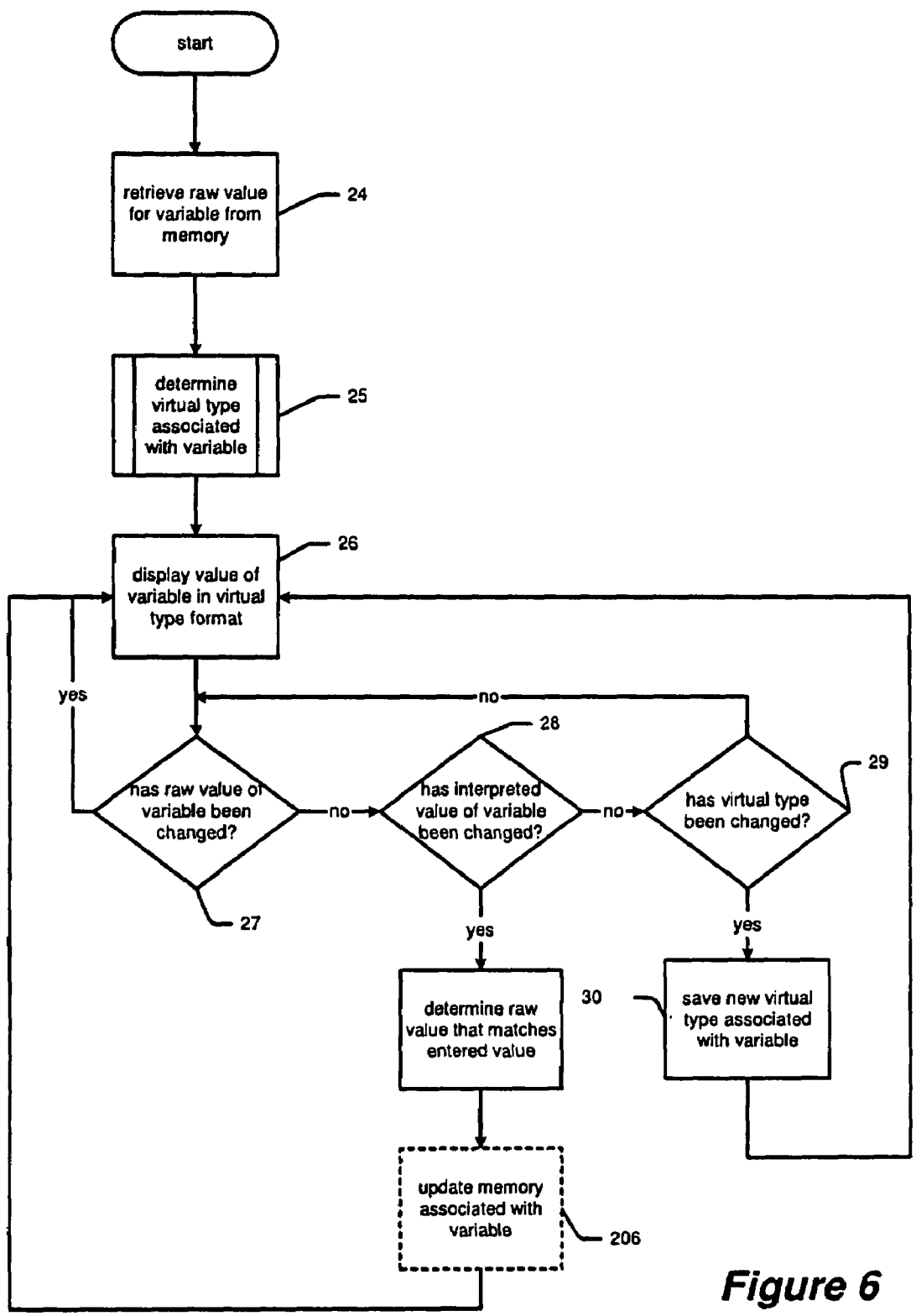
FIG. 6 is a flow chart illustrating the operation of the window shown in FIG. 2.

FIG. 6 is a more detailed flow chart illustrating the operation of the window shown in FIG. 2. FIGS. 3 and 4 may operate in a similar manner. At 24, when the window 19 is displayed, the data stored at the memory location associated with the Alpha variable is retrieved from memory. The virtual type associated with the variable is then determined 25, which can be done in a number of ways. For example, the user may select a particular radio button 17 or otherwise indicate the virtual type associated with the Alpha variable. Other methods may also be used, including those disclosed in this patent. Once the virtual type is determined, the value of the variable Alpha, as interpreted by the virtual type associated with it, is displayed 26. If the user changes the raw value of the variable 27, the new interpreted value is updated and displayed 26. If the user changes the interpreted value 28, the new raw value that matches (or most closely matches) the interpreted value is determined and may also be stored in the memory location associated with the Alpha variable (206), and the display is also updated 26. If the user changes the virtual type associated with the variable Alpha 29, the display is updated 26. The virtual type associated with the variable Alpha may also be saved 30 so that the Alpha variable may default to the selected new virtual type in future operations. The virtual type may be stored in any location, including in a workspace file or symbol table. This process may continue until the window 13 is closed or otherwise terminated.

Once the virtual type for a particular variable is known, the proper interpreted value typically can be readily determined, usually through some type of formula. In the case of Q-types, for example, the pertinent formulas have been described above. However, if the virtual type for a variable is not known, it may be difficult to properly display its value in a form that is readily understandable to the user.

Figure 7:
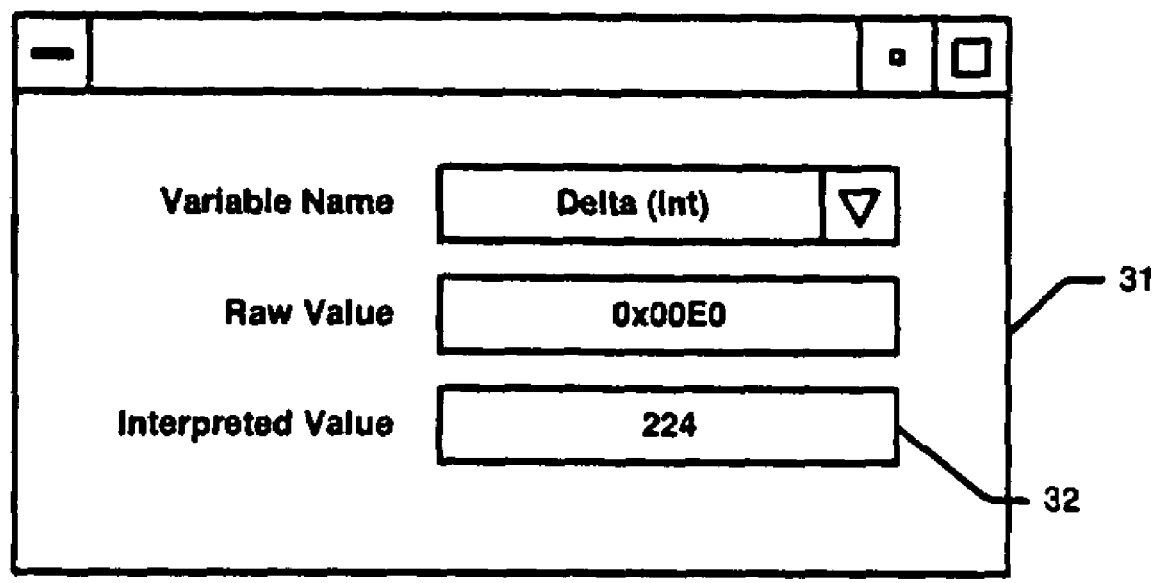
FIG. 7 is a screen display showing a "watch"-type window.

For example, in FIG. 7, the window 31 illustrates a watch or edit window in a development or debugging environment where the virtual type for the Q-type variable Delta is not known. In the case of FIG. 7, the debugging environment associated with window 31 only sees that the variable Delta is of type "int" and it does not know that the variable Delta is a virtual Q-type. It therefore assumes that the Delta variable is to be interpreted as an integer, and displays its value as simply 224, which is the integer value of 0x00E0 (see window 32 in FIG. 7). This may not be a very useful way to display the data for the user of the debugging tool associated with window 31, since the value 224 often will have little meaning to the user because it is not the value that the Delta variable is intended to represent. Instead, the value the variable represents may be quite different (the value is actually 3.5 if Delta is a Q6 variable). To translate the value 224 to its proper interpreted value, the user is left to determine its virtual type (i.e., its Q-type), and the user must also do the math (e.g., 224/(2^6) =3.5) to determine the properly interpreted value of the variable. The converse is also true. If the user wants to change the value of the Delta variable in FIG. 7 to 12.78, and thereby modify the memory associated with the Delta variable, the user may have to (1) first calculate the Q6 raw_value equivalent of 12.78 (raw_value=12.78*2A6=817.9200 =818) and then (2) enter the value 818 in window 32.

The process of determining a virtual type (25 in FIG. 6) for a variable therefore can be, in some cases, useful or important. Yet in many situations, the virtual type of a variable is not readily apparent. For a Q-type, the native or raw type is typically int (16 bit) or long (32 bit). Normally, software development environments or even debugging tools cannot readily determine, based on a conventional processing of the project source files, whether a particular int or long variable should be interpreted as an integer, or whether it should be interpreted in another way, such as a Q-type virtual type. Typically, the development environment views Q-types and integers as the same. Therefore, a debugging environment may have difficulty displaying the proper interpreted value for a particular variable if it is unable to ascertain if a particular variable has a virtual type associated with it.

Figure 8A:
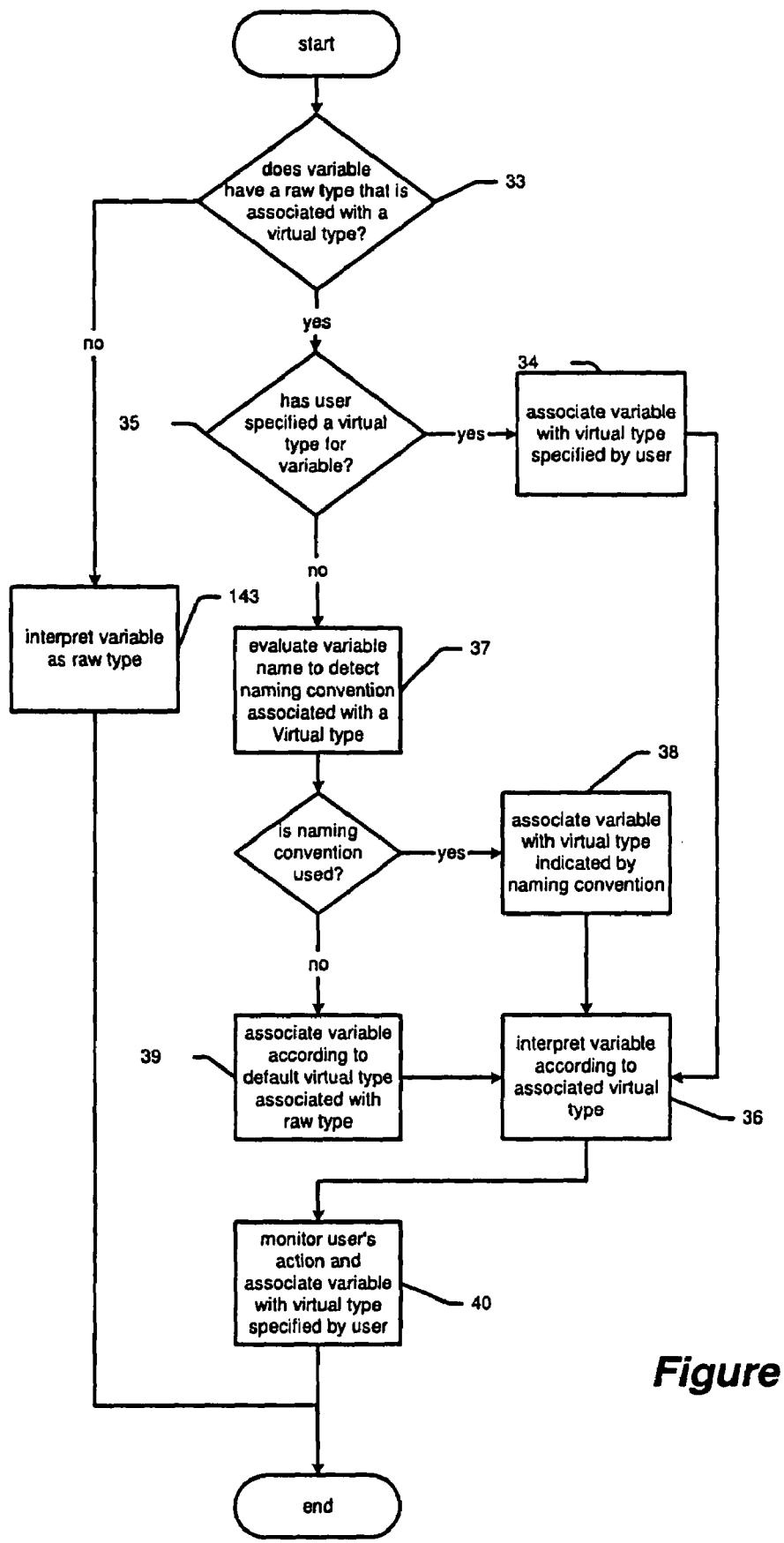
FIG. 8a is a flow chart illustrating the operation of determining a virtual type associated with a variable in one embodiment.

FIG. 8a is a flow chart illustrating the operation of determining a virtual type associated with a variable (25 in FIG. 6) in one embodiment. At 33, if the variable does not have a raw type that is associated with a virtual type, the variable is interpreted according to the format indicated by its raw value (see 143). For example, in some situations, virtual types are only applicable to "int" type variables, so a variable that has a different type, such as a "float" or a pointer type, may not be susceptible to being interpreted as a virtual type. If the variable does have a raw type that is associated with a virtual type, then it is determined whether the user or developer has specified in some way a virtual type for the variable 35. For example, if the user has changed the virtual type for a particular variable in a watch or edit window, such as that in FIG. 2, for example, the virtual type association may have been saved (see 30 in FIG. 6). Alternatively, in some embodiments, the user's input may even be requested. If the user has specified a virtual type for the variable, the variable is associated with the virtual type specified by the user (see 34) and interpreted (see 36) according to the associated virtual type.

If the user has not specified a virtual type for the variable, the variable's name is evaluated to determine whether it has a naming convention that suggests a particular virtual type 37. If it does, the variable is associated with the virtual type indicated by the naming convention 38 and interpreted accordingly 36. If no naming convention is detected, the variable is interpreted according to the default virtual type associated with the raw variable 39. For a variable that has a raw type of "int," this may simply mean interpreting the variable as an integer, but other default interpretations or virtual types could also be used (e.g., binary coded decimal, or Q8). The user or developer may then continue to be monitored 40 to determine whether the user is associating, though input or otherwise, a virtual type with the variable. In some embodiments, later actions by the user may override earlier virtual type determinations.

Figure 9:
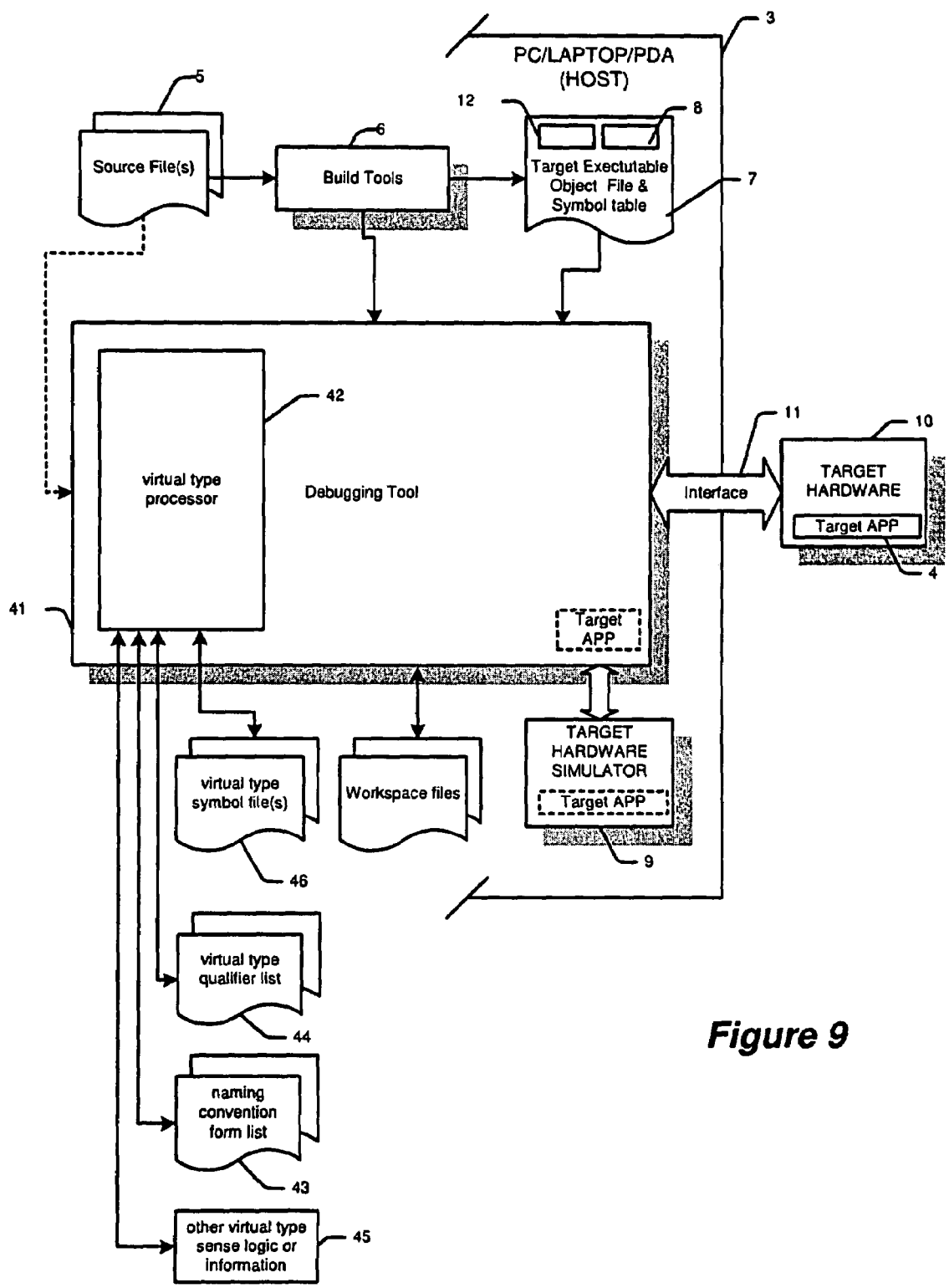
FIG. 9 is a block diagram of a software development environment.

FIG. 9 is a block diagram of a software development environment utilizing a debugging tool 41 that includes a virtual type processor 42. The virtual type processor 42 in the embodiment shown scans the source files 5 and detects the virtual types associated with the variables declared in the source files 5. A number of items assist the virtual type processor 42 in determining the virtual type that is associated with a particular variable declaration, including a naming convention form list 43, a virtual type qualifier list 44, and/or other virtual type sense logic or information 45. Associations between variables and virtual types are stored in one or more symbol table files 46. In some embodiments, the virtual type symbol table files 46 may be stored in other locations, or integrated with other files, such as the target executable 7 or symbol table 8, or elsewhere. It should be understood that any appropriate method of storing and/or tracking this information is contemplated.

The operations performed by the processor 42 may be carried out at any time. For example, in some embodiments, the processor may act as a preprocessor that scans various project files when a project is loaded and attempts to determine the virtual types associated with one or more variables in the project. In other embodiments, the processor may also operate periodically or upon certain events occurring during a given development, emulation, or debugging session. The processor 42 may also operate only as needed in some embodiments, attempting to determine a virtual type for some variables only when needed, or on-demand. In other embodiments, the processor may operate in other ways, or in a combination of ways, and it need not be limited to only those techniques or methods of operation specifically described.

In FIG. 9, the debugging tool 41 is shown interacting with a number of files 43, 44, and 46 and other logic 45, and is shown separate from the build tools 6. In other embodiments, some or all of the functionality of the debugging tool 41 may be integrated into the build tools 6, so that a combined build tool/debugging object is interacting with the files and logic shown in FIG. 9. In general, any particular module shown in FIG. 9 or elsewhere may be integrated into one or more other modules, as appropriate, and it should be understood that the present disclosure encompasses such combinations and integrated modules.

FIG. 10a illustrates a virtual type qualifier list that may be used by the virtual type processor 43 to determine virtual types for given variables. The first value shown, to the left of the colon, is a virtual type, followed by all of the type definitions that should be associated with that virtual type. For example, if a variable type is defined in some way in the source files for a given project, and that type is named "bcd_long," then the variables declared using that type are to have binary coded decimal virtual types. Similarly, if a particular type named "q2" is defined in the source files, then all variables declared with that type are to have a virtual Q-type of Q2.

FIG. 10b illustrates a naming convention form list where virtual types are listed with the form of one or more variable naming conventions that may be associated with various virtual types. Like FIG. 10a, the first value shown is a virtual type. The expressions following the colon represent the form of a variable naming convention that should be associated with that virtual type. For example, variable starting with the letters "bcd" or ending with the letters "_bcd" or including the letters "_bcd_" are to have binary coded decimal virtual types. Similarly, variables starting with "q2" or including the characters "_q2_" are to have a virtual Q-type of Q2.

In general, any information or logic (45 in FIG. 9) that may be employed to enable the virtual type processor 42 to effectively discern whether and what type of virtual type may be associated with a given variable may be used by the virtual type processor 42. In some situations, other information or logic may usefully employed, and is contemplated within the scope of some embodiments of the invention.

Figure 11:
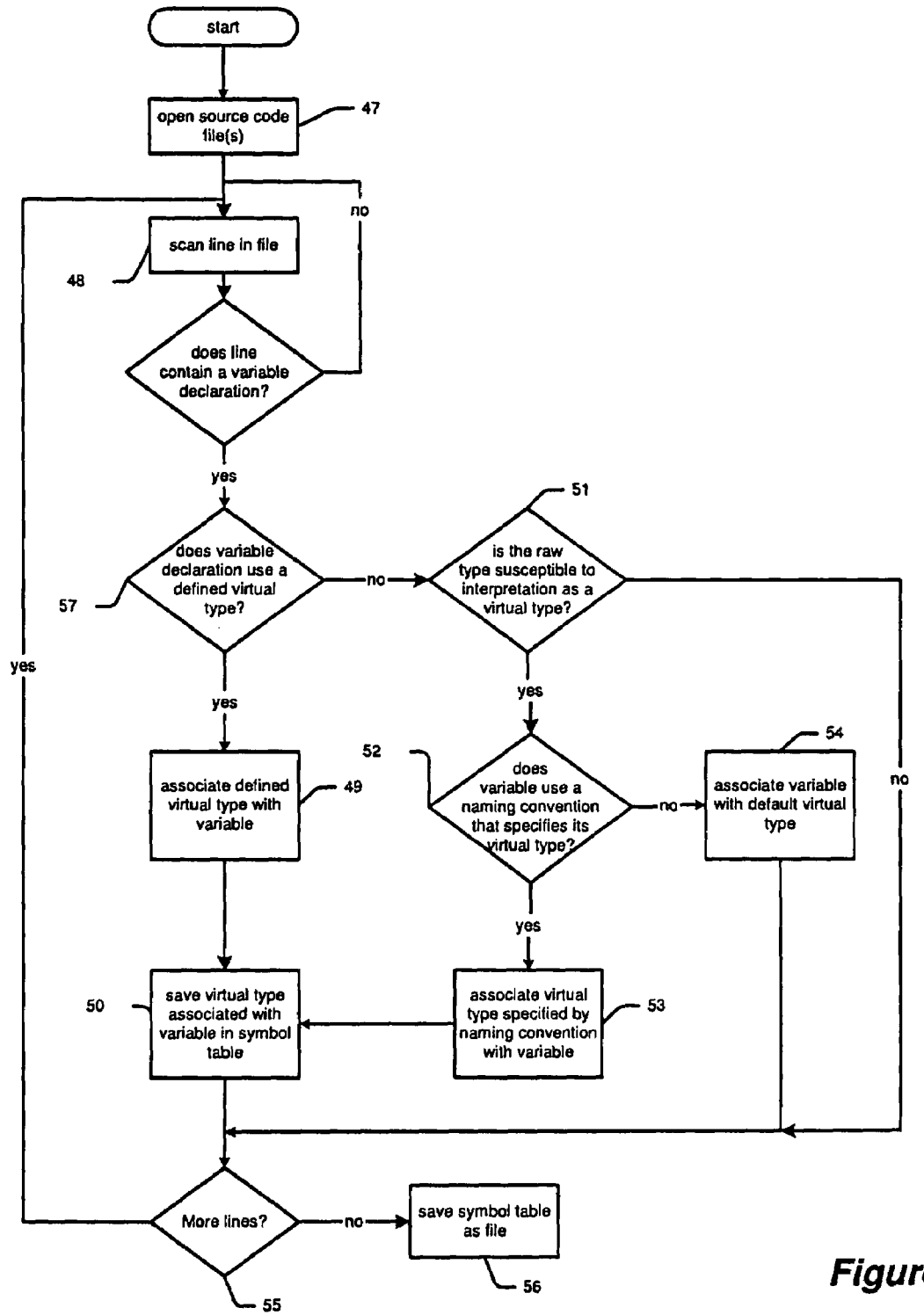
FIG. 11 is a flow chart illustrating the operation of a virtual type processor in one embodiment.

FIG. 11 is a flow chart illustrating the operation, in one embodiment, of the virtual type processor of FIG. 9. At 47 a source code file is opened, and each line of the file is scanned for variable declaration(s) 48. If a variable declaration is found, and if it uses a predefined virtual type, as defined in the virtual type qualifier list, the defined virtual type is associated with the variable 49, and that association is saved in a symbol table 50. Otherwise, if the raw variable type is susceptible to interpretation as a variable type (e.g., it is an integer, where virtual types may use raw types as integers), then the variable name is evaluated to determine whether it uses a naming convention that indicates its virtual type 51,52. If so, the indicated virtual type is associated with the variable 53, and that association is saved in the symbol table 50. Otherwise, the variable is interpreted using a default virtual type 54, or in some embodiments, using the raw type. When line scanning is complete 55, the symbol table is saved as a file 56 (see file 46 in FIG. 9), if it has not already been saved as a file. The process illustrated in FIG. 11 may be repeated for each source file in the development project.

In some embodiments, the determination at 51 in FIG. 11 of whether a raw type is susceptible to interpretation as a virtual type may be optional, or it may be applied prior to determining whether the variable declaration uses a defined virtual type 57.

Figure 8B:
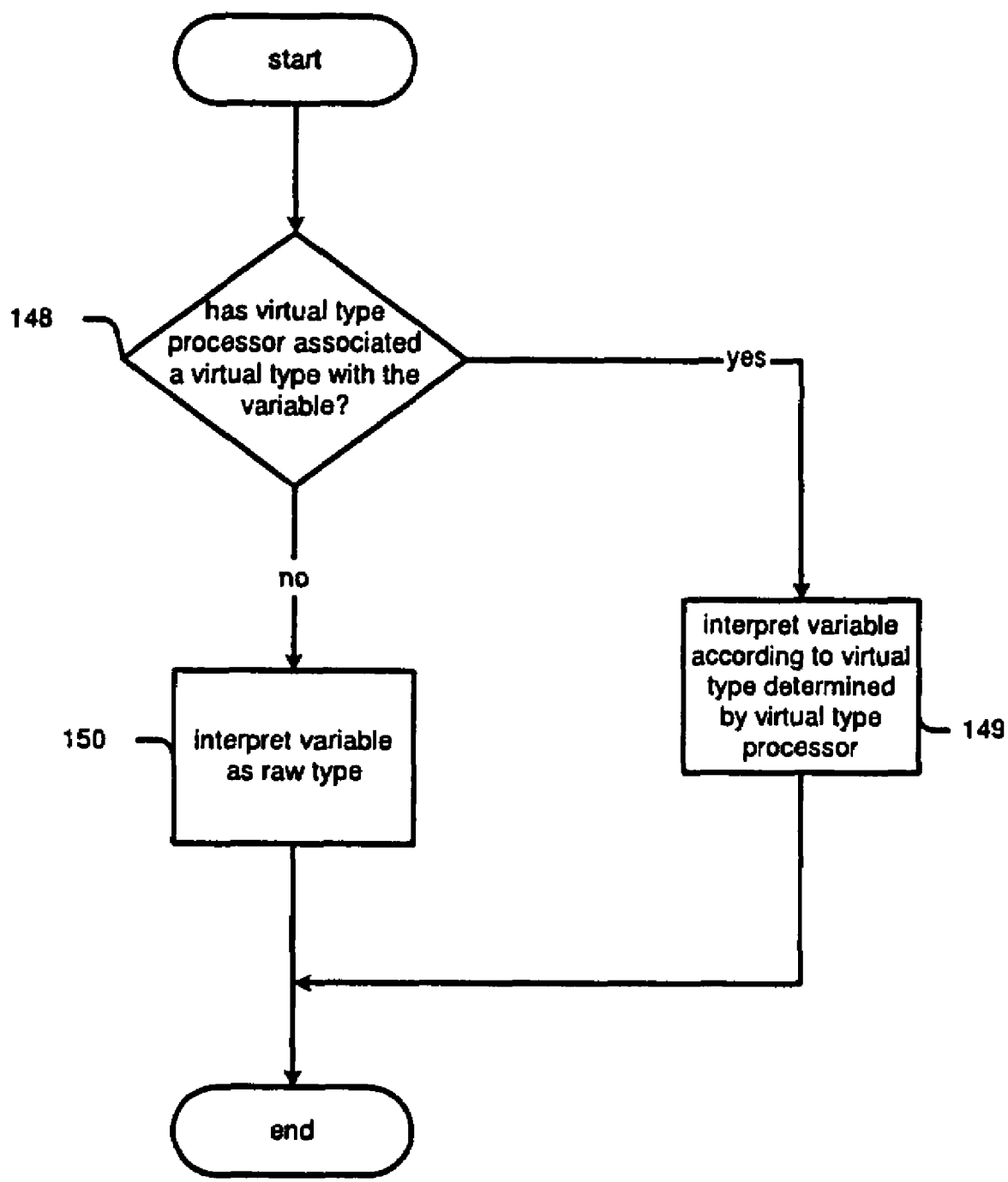
FIG. 8b is a flow chart illustrating the operation of determining a virtual type associated with a variable in another embodiment.

The virtual type processor 42 of FIG. 9 thus provides an additional way in which a variable's virtual type can be determined. FIG. 8b is a flow chart illustrating the operation of determining a virtual type associated with a variable (25 in FIG. 6) in another embodiment. This embodiment involves determining whether the virtual type processor 42 has associated a virtual type with the variable (see 148 in FIG. 8b). Determining a variable's virtual type may simply involve accessing the information generated by the virtual type processor. Accessing this information may involve loading the virtual type symbol table 46 generated by the virtual type processor, or accessing this information from any other location where that information may be stored. Such information may be stored in memory or in another file, such as the symbol table 8 shown in FIG. 9 or in a workspace file.

If the virtual type processor has associated a virtual type with the variable, then the variable is interpreted according to the virtual type determined by the virtual type processor (see 149). Otherwise, the variable is interpreted according to its raw type (see 150). In other embodiments, where the variable has not been associated with a virtual type by the processor 42, one or more the procedures undertaken in FIG. 8a may be carried out, instead of interpreting the variable as a raw type (as in 150 in FIG. 8b). Normally, determining the virtual type of a variable from the information generated by the processor 42, may be the preferred method, since it requires little or no input from the user.

Figure 12:
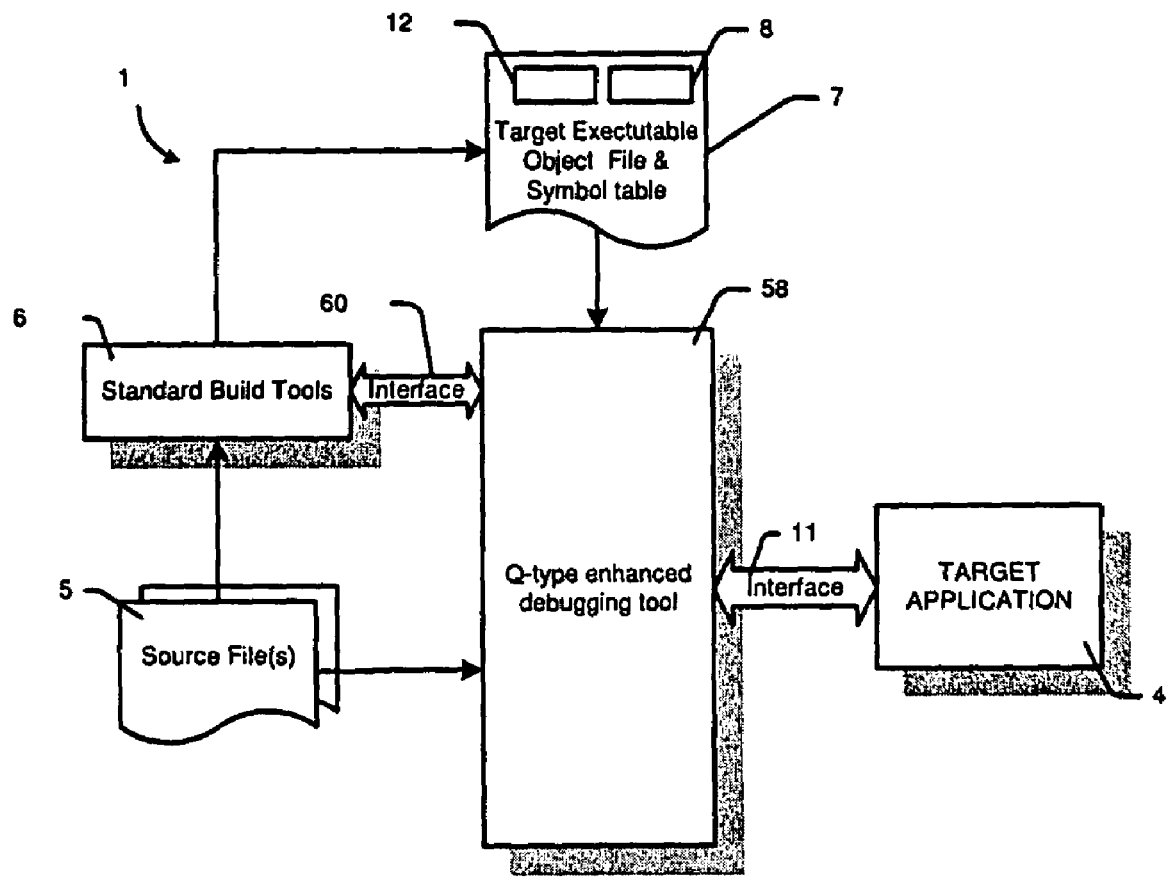
FIG. 12 is a block diagram of a software development environment in one embodiment that uses "Q-type" virtual types.

FIG. 12 is a block diagram of a software development environment 1 in one embodiment that uses "Q-type" virtual types. Included within the environment shown are source files 5, build tools 6 and a target application 4. A debugging tool 58 interacts with various components of the system in FIG. 12 and supports debugging a target application 4 that uses Q-type variables.

In operation, the enhanced debugging tool (58) is used to inspect and/or modify variables and memory locations of various Q-types contained within the target software application (4). The tool 58 provides methods for determining, tracking, viewing and modifying variables of various Q-types in an intuitive and user friendly manner. Source files (5) specify the functionality of the target application 4 and are processed by a set of build tools 6, creating the target application executable file 7. The enhanced debugging tool (58) can initiate or be called from the standard build tools over a tools interface (60) or certain aspects of the functionality of 58 can be incorporated within the standard build tools 6. The executable file 7 typically contains within it a symbol table 8 which lists the name, raw type and size of all the variables defined by source files 5. The debugging tool scans the set of source files (5) looking for key words which will determine a variable name and associated Q-type. This association is saved by the tool for later use, perhaps in the symbol table 8 or in a separate file (not shown). The debugging tool is connected to the target application over an interface (11) which allows communication between the enhanced debugging tool and the target application 4. This communication allows the debugging tool to inspect, display and modify specific variables and memory locations within the target application.

FIG. 12 in some embodiments includes logic that is able to maintain and track the association of variable names and their Q-type. Further, logic that enables easy viewing and modification of Q-type variable values as their floating point equivalent may also be implemented, thereby providing an easy, intuitive approach to entering new variable values, and allowing the user to change the value of a Q-type variables by entering a floating point equivalent. Also, in some embodiments, the debugging tool 58 allows variables of different Q-types to be inspected and modified within the same window view, and provides saturation protection for new values which are entered by the user.

In some embodiments, the debugging tool 58 of FIG. 12 is capable of automatically detecting a variable's Q-type. The Q-type of the variable can be determined in a number of ways. For example, the Q-type of variables can be determined by reading the Q-type associated with each variable from a "Q-type object file" which has a list of variable names in the target application and their associated Q-type. Another method involves extracting the Q-type from the variable name by looking certain naming conventions, such as variables containing the string fragment q?? anywhere in the name. Another method involves receiving input from the user that indicates the Q-type for one or more variables. In this last approach, the Q-type could be manually entered by the user through, for example, the use of a dropdown or edit field.

In embodiments employing the use of a Q-object file, various methods for creating and maintaining such an object file may be employed. For example, in some embodiments, a compile time Q-type preprocessor scans all target application project files to identify the virtual Q-types of all variables and creates the Q-object file. Derived or virtual typedef qualifiers may be used to declare each variable, such as: "q15 myvariable."

In other embodiments, a user interface tool may be used to load an existing Q-object file or the symbol table (8) from the target executable file (7), thereby listing target application variable names, providing the user with the opportunity to enter/change the associated Q-type for each variable. In such an embodiment, the Q-object file may be automatically updated as the user makes changes.

Also, in some embodiments, as the user manually enters variable names or a new Q-type for a specific variable name in the target application during a debugging session or the like, the associated Q-object file is automatically updated. If necessary, the variable name may also be added to the object file, and the new associated Q-type updated and stored.

Figure 13:
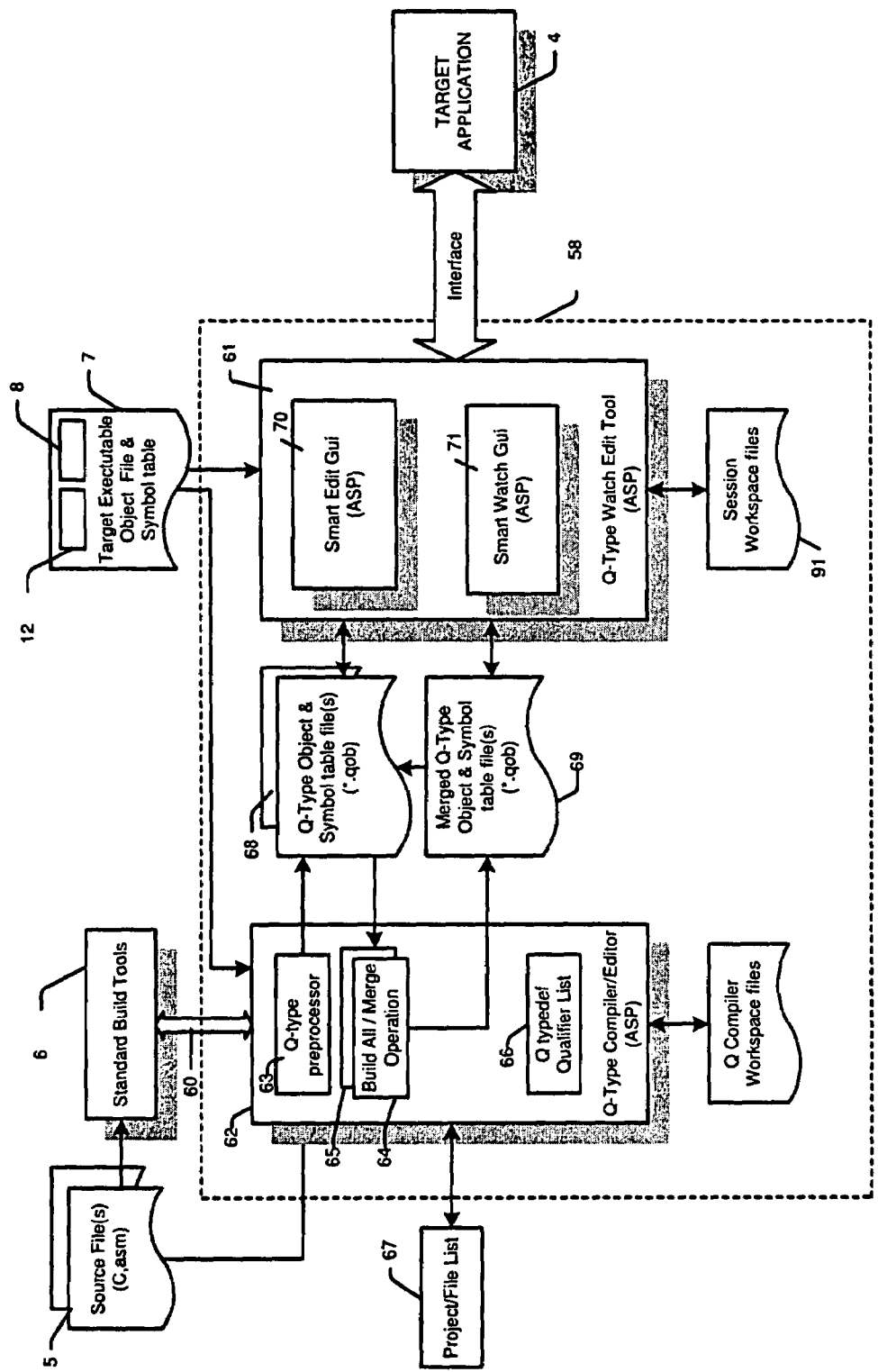
FIG. 13 shows a block diagram of a software development environment in one embodiment.

FIG. 13 shows a detailed block diagram of a software development environment, such as one similar to that described in connection with FIG. 12. FIG. 13 creates a Q-type support environment providing methods for determining, tracking, viewing and modifying variables of various Q-types. A Q-type watch/edit tool 61 in FIG. 13 provides the user with a means to view and/or modify—entirely in the "floating point" domain—variables or expressions running in the target application 4. A Q-type compiler tool 62 creates an initial variable name and Q-type association for some or all variables (typically just Q-type variables) within the target application 4 or listed in the symbol table 8. To do so, the Q-type preprocessor (63) scans all source files for variable declarations using Q-typedef qualifiers in order to assign Q-types to the variables within the target application. In some embodiments, this information is saved to a Q-type object and symbol table 68 which is saved within a Q-type object file. The Q-type object file (68) thus contains among other things, a list of Q-type symbols and their associated Q-type. A Merged Q-type object file (69) is a Q-type object file which contains the combined Q-type symbol tables of several individual Q-type files.

Logic for performing a Build All Operation (64) creates a global Q-object file which contains information about all Q-type variables within the target application 4. Logic for performing a Merge Operation (65) combines the information from several Q-object files 68 into one Q-object file 69. A Q-typedef qualifier list (66) is a list of the typedef qualifiers to associate with each possible Q-type. These are the typedef qualifiers that the virtual type preprocessor will search for within the source files. There is a "one Q-type to many" typedef qualifier string mapping. The Project/File List (67) contains a list of projects and source files used to create the target application.

The Smart Edit Gui (70) is a graphical user interface object that allows viewing and modifying of a single variable or expression of any Q-type. The Smart Watch Gui (71) is a graphical user interface object that allows viewing and modifying of several variables and/or expression of various Q-types within the same window view.

The embodiment of FIG. 13 may provide some aspects of enhanced Q-type support or some aspects of a "Q-Smart™" debugging tool, which uses Q-Sense™ and Q-Edit™ technology. Q-Sense™ Technology is the base technology that automatically detects (either through variable names or other means) the Q-type of a target variable. Q-Edit™ Technology is the base technology that automatically converts fixed point Q-type values to their floating point equivalent for display purposes and automatically converts floating point user entries to their fixed point Q-type equivalent so that users can searnlessly view and change Q-type variables entirely within the floating point domain.

In some situations, current debug tools show the value of Q-type variables and memory locations based on the variable's raw or native type (int, long, etc.) and are not very user-friendly when it comes to viewing and modifying Q-type variables. Some debugging tools provide rudimentary support for Q-types, but may require running clumsy "script" files to display the value and a second script file to modify the value. These support tools often do not allow an easy way for the user to view and modify Q-type variables of various Q-type from within the same window view. They also may require the user to know and keep track of the Q-types himself or herself. In addition, they may also fail to properly check the range of the new values that are entered, which can result writing erroneous data to the variable or memory location.

In some situations, embodiments based on the block diagram of FIG. 13 allow users to easily view the floating point equivalent of fixed point Q-type variables and allow users to enter values as floating point, relieving the user of the task of manually doing the Q-type conversion. Furthermore, the environment in the embodiment of FIG. 13 may automatically determine and keep track of the Q-type associated with the variables defined within the target application, which may relieve the user of this task as well. In some embodiments, the development environment in FIG. 13 is flexible enough to work with existing target source files, working with whatever variable naming conventions and type definitions the user may have defined, so as not to require the developer to rewrite source code in order to start using the tool. In many situations, the embodiment of FIG. 13 provides a more natural and intuitive use of the debugging tools and lets the user quickly inspect and change values, allowing the developer to concentrate on development.

The Q-type watch/edit tool 61 in FIG. 13 provides the user with the ability to view and/or modify variables or expressions running in the target application 4. In FIG. 13, this ability is provided through the Smart Edit Gui (70) and Smart Watch Gui (71) tools. Still referring to FIG. 13, the Q-type watch/edit tool 61 may load the standard symbol table (8) from the target executable object file (7) to get the raw types and names of all the variables within the target application (information in the symbol table may be available through other means, or the symbol table may be loaded by another component of the system). The Q-type watch/edit tool 61 can also optionally load a Q-type object file (68) at startup. If such an object file is not loaded, the tool 61 will typically create an empty Q-type object file. In some embodiments, the tool 61 will load a Q-type object file created by the Q compiler 62 or from a previous watch/edit session. In either case, the Q-type object file, referred to as the "session" Q-type object file, is typically updated as the user adds new expressions or variables and when the user manually assigns the Q-type to be associated with a variable or expression. In this way, the tool 61 maintains and tracks the list of variable names and Q-type associations so that the next time the tool 61 is used, the user does not have to manually enter the Q-type again.

Figure 14:
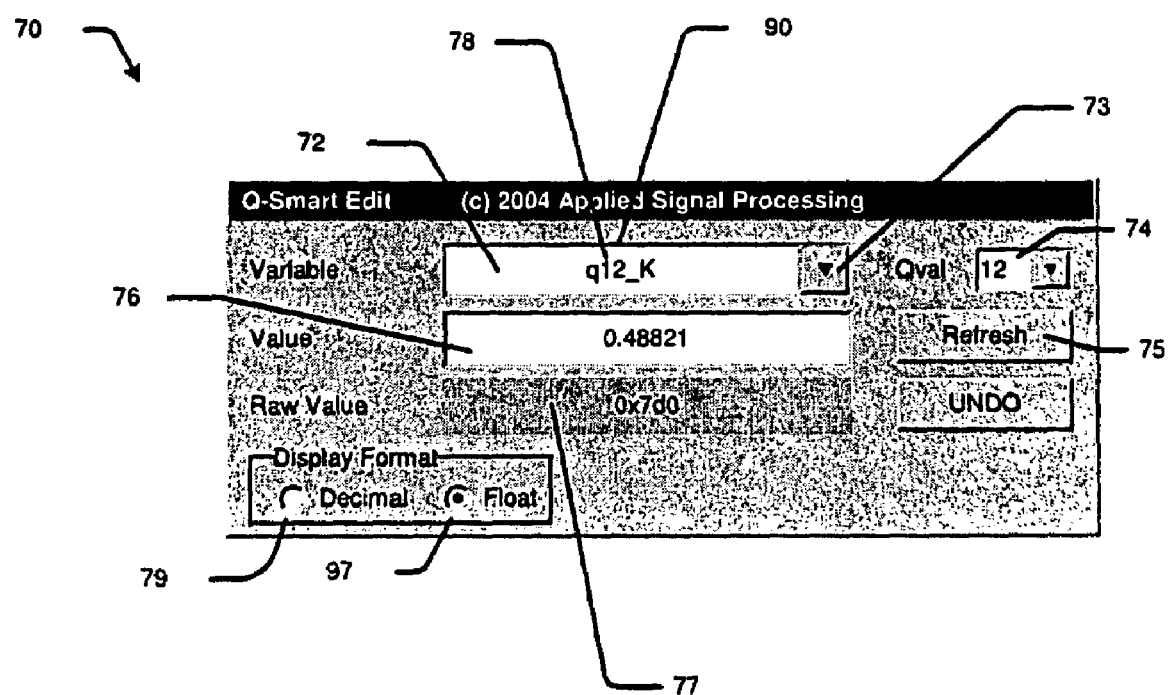
FIG. 14 is a screen display showing an edit window in one embodiment displaying a variable interpreted as a "Q-type."

FIG. 14 is a screen display showing an edit window 70 or Q-Smart™ Edit Gui displaying a variable interpreted as a Q-type. A variable name dropdown/edit field 72 contains the name of a variable or expression to view and/or modify. A variable name dropdown button 73 displays a list of previously-entered variable names and expressions (or other available names and expressions). A Qval dropdownledit box 74 allows the user to manually select the Q-type of the variable being displayed. The refresh button 75 initiates a read from the target and updates the value field 76. The Undo button allows the user to undo a previous entry in the value field 76. The value field 76 shows the current value of the variable or expression in the selected virtual type format. This field allows the user to enter and display new values for the variable. The raw value display field 77 shows the raw or native value of the variable in hexadecimal format. Other formats could be used as well. The display format radio buttons 79 and 97 allow the user to select the display format for the value field 76.

In operation, the window 70 allows a user to view and change a particular variable in the "floating point" domain. Logic associated with the window 70 automatically determines the Q-type of the variable and converts between its raw or native type and the floating point equivalent. In the variable name field 72, the user can either enter or select a variable name or enter an expression 78. When a variable name is entered, for example 'q12_K', the data in the memory location associated with that variable is read from the target application and displayed in a the value field 76, using the display format selected by a set of display format buttons 79 and 97. An expression is typically a valid C expression (e.g., 'q12_K*2.5'), which the tool will evaluate and whose end result is displayed in the value edit/display field 76. (A variable name is, by definition, a simple C expression, so the tool may always be considered to be evaluating an expression.) In FIG. 14, when the "decimal" radio button 79 is selected, the integer or raw value of the variable is displayed. When the "float" radio button 97 is selected, the interpreted value (having a factional component) is displayed, where this interpreted value is based on the current virtual type (Q-type) of the variable.

Some embodiments of the window 14 may provide additional functionality. For example, scalar variables and expressions may be allowed in the name edit field 78. Arrays and structures could be displayed using an expanded display field 76, or they could be displayed as a '.' in the value field 76. As variables and expressions are added, they may get added to the dropdown list and stored, perhaps in a session workspace file. New expressions are also stored, perhaps in a session object or Q-object file. A default Q value may be set by the user using clicking on the title bar or right clicking on the Qval select dropdown (74). This default Q value may be used by the ExtractQvalFromnName( ) function as described in FIGS. 15 and 16. When the Q-value of a particular variable or expression is changed, the new variable name and Q association may be saved into the session workspace and session Q-object file. The window 14 may automatically refresh the value field when the associated target debugger halts (i.e. hits a break point). In addition, "auto complete" functionality may be used with an "auto suggest" dropdown list for the variable name entry based on symbol table information. As the user starts to enter a variable name, a search is undertaken for existing variable names that match the typed text, allowing the user to quickly and conveniently find the desired variable.

Also, in some embodiments, logic associated with the window 70 may allow the window's state to be saved/recalled into/from a session workspace file. The saved information associated with the window's state may include one or more of the following: (1) the session variable name and Q value association, (2) the number of window or Q-Smart™ Edit window instances open, (3) the current variable name selection for each instance, and (4) the variable name/dropdown list entries for each instance.

Figure 15:
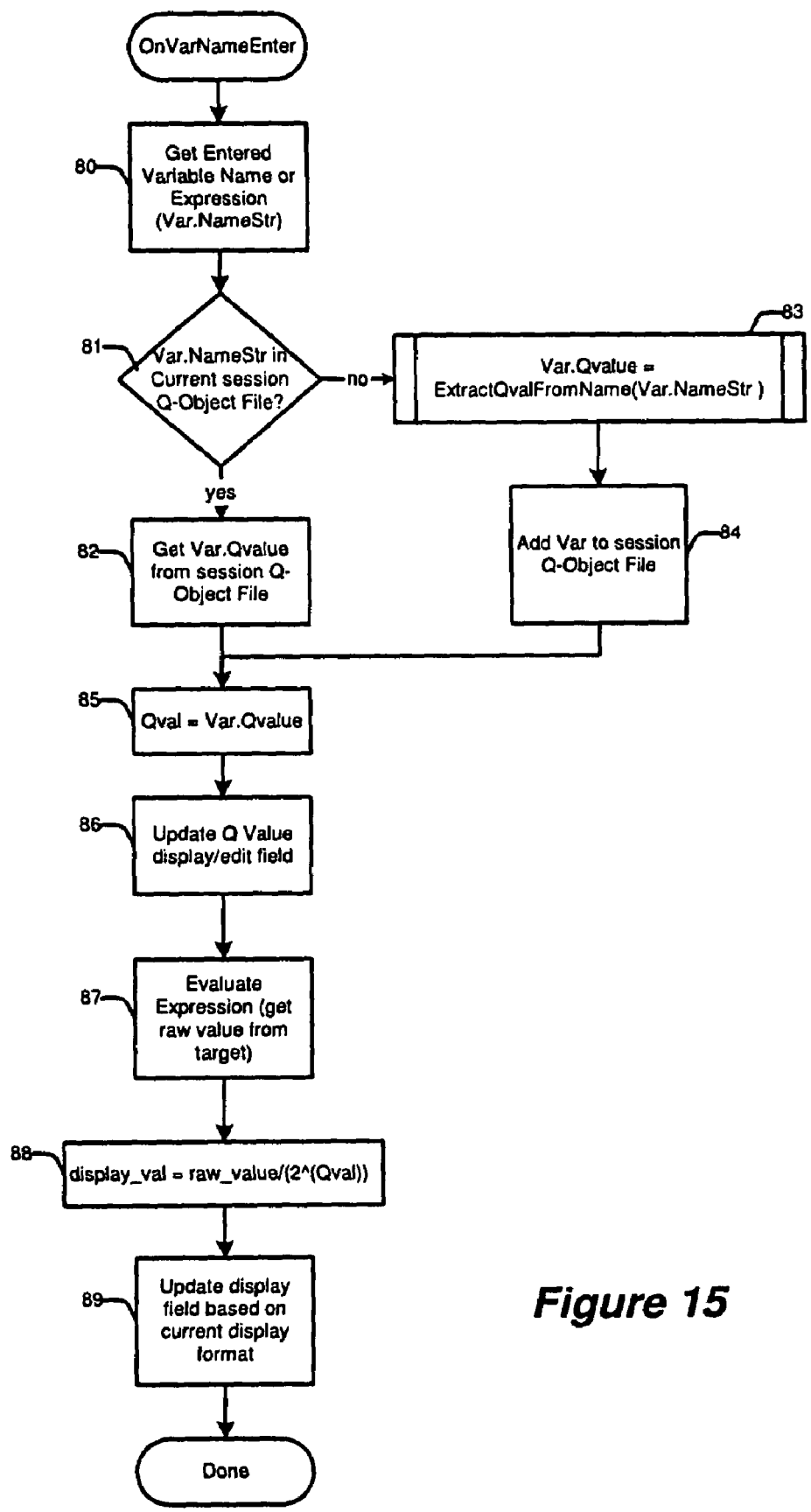
FIG. 15 is a flow chart illustrating the functionality of the Q-type detection logic in one embodiment.

FIG. 15 shows the functionality of an embodiment of the "Auto Q-Sense" and display field update logic that is executed when a new variable name or expression is entered into the variable name edit field 72. In FIG. 15, logic at 80 retrieves the variable name or expression as a string (78) either when the user enters a new string or selects a string from the dropdown list associated with the name edit field (72) using dropdown button (73). If the string is already in the session Q-object file (68 in FIG. 13), the associated Q-value is assigned from the Q-object file (81 and 82). If the string is not there, the Q-type is assigned according to function ExtractQvalFromName( ) (83) and the variable string and associated Q value is added to the session Q-object file (84).

Figure 26:
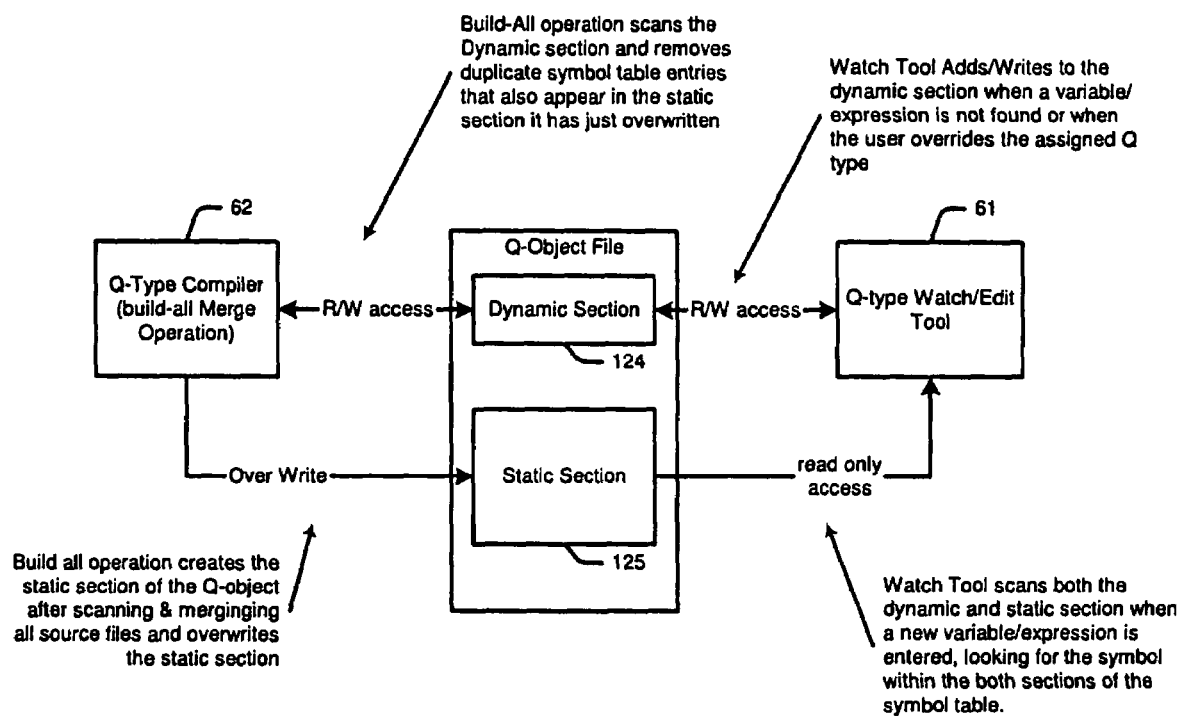
FIG. 26 is a block diagram of a Q-object file.

In some embodiments, this information may be added to a dynamic portion of the session Q-object file. See FIG. 26.

Once the Qval is assigned (85), the assigned Q value is updated in the Q value edit box (74) (see 86 in FIG. 15). The expression is evaluated and/or a value is read from the target application, returning a raw_value result (87). A display value is calculated, based on the raw value and the Q value according to the following relation: display_val=raw_value/(2^Qval), where the ^ symbol means "raised to the power" i.e. $2^3=8$. See 88. Once the display value is calculated, the value edit/display field (76) is updated based on the selected display format (79 or 97) (see 89). The raw value display field 77 is also updated to the show raw_value in hex format.

In some embodiments, the variable name dropdown edit list box (90 in FIG. 14) itself maintains a list of expressions and variable names entered by the user. The content of the list box (90 in FIG. 14) may be stored to a session workspace file (91 in FIG. 13).

At 87, the watch/edit tool is using whatever means are available to receive the raw value result of the variable or expression (78 of FIG. 14) within the target application (4) over the interface (11) (See FIG. 13). In most cases, it will be calling a specific API to a standard debugging tool or ActiveX control to get the value of either an expression, a specific memory location, or a specific variable.

Figure 16:
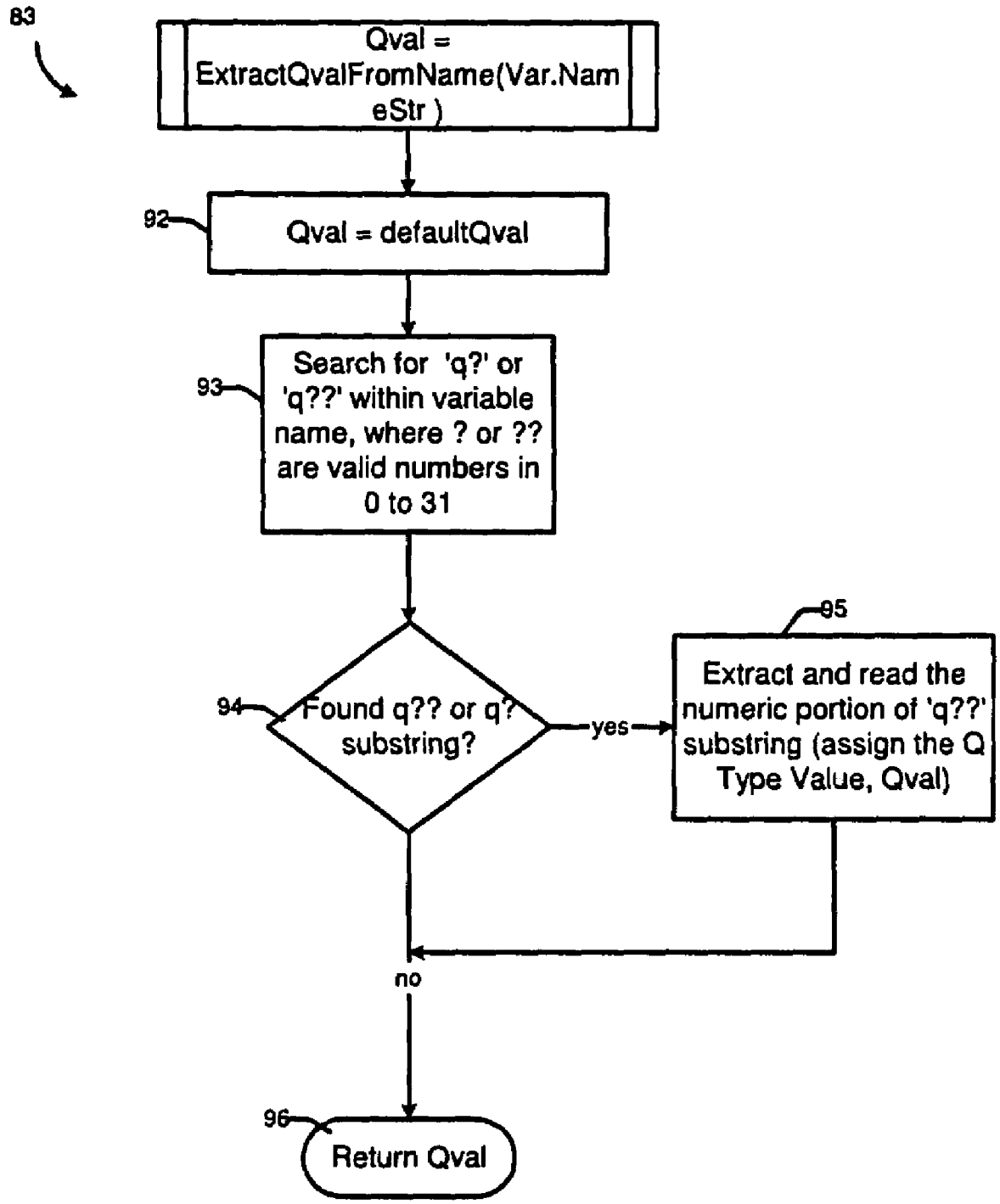
FIG. 16 is a flow chart illustrating the logic for the ExtractQvalFromName( ) function.

FIG. 16 shows the flow chart for the ExtractQvalFromName( ) function of the watch/edit tool in one embodiment. This function may be called for variable strings which do not appear in the current session Q-type object file. This procedure extracts the Q-type of the variable from the variable name. (It is a common Computer Science variable naming convention to include the variable type within the variable name, an approach referred to as the "Hungarian" naming convention). In FIG. 16, the Q value is assigned the current default Q value (as previously set by the user) (92) and then the function searches the variable string (78) for a substring containing either 'q??' or 'q?' (see 93). If the substring was found (decision 94), then the Q value is read from the numeric portion of the substring (see 95). The function then returns the Q value (see 96) which is either the default value or the value found within the q?? substring. For example, with a default Q value of 15 and variable strings of 'q12_K', 'the_q8_variable', and 'no_qname', the ExtractQvalFromName( ) function returns Q values of 12, 8, and 15, respectively. Other similar "substuing keys" could be used to identify the Q-type.

FIG. 17 is a screen display showing an example of the operation of the edit window of FIG. 14. Shown in FIG. 17a is the Q12 target variable 'q12_K', whose raw value is 0x7d0, which, interpreted as an integer, is the value 2000. Interpreted as a Q12 value, however, the value of the q12_K variable is $2000/2^{12}=0.488281$. When the "decimal" radio button 79 is selected, the q12_K variable is displayed as an integer in its raw form, as shown in FIG. 17a. When the "float" radio button 97 is selected, the q12_K variable is displayed as a number with a fractional component, as shown in FIG. 17b. The user may change the interpreted value of the variable q12_K, as shown in FIG. 17c, which causes a new raw value to be calculated, based on the selected Q-type 74, and the new raw value is displayed and may also be written to memory (or to the memory of the target hardware).

Figure 17A:
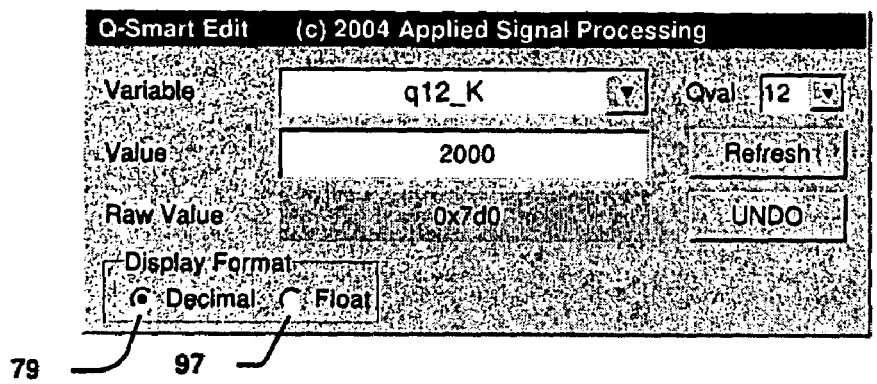
FIG. 17 is a screen display showing an example of the operation of the edit window of FIG. 14.
Figure 17B:
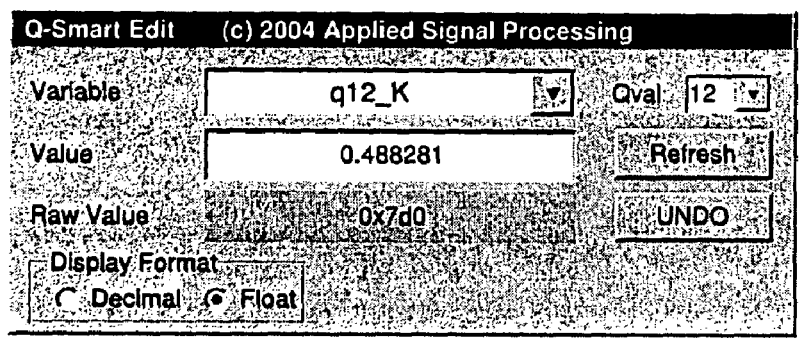
Figure 17C:
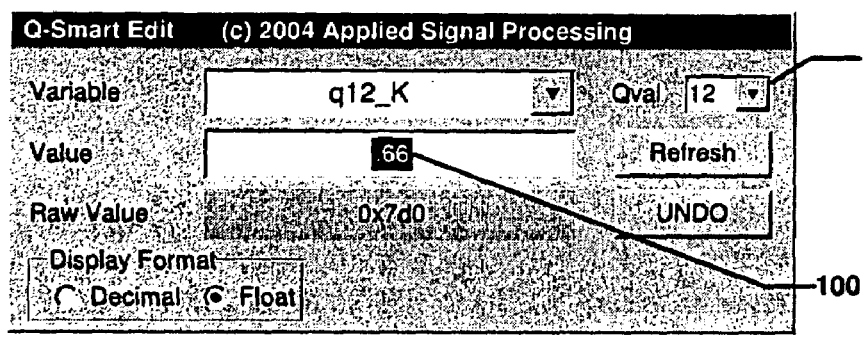
Figure 17D:
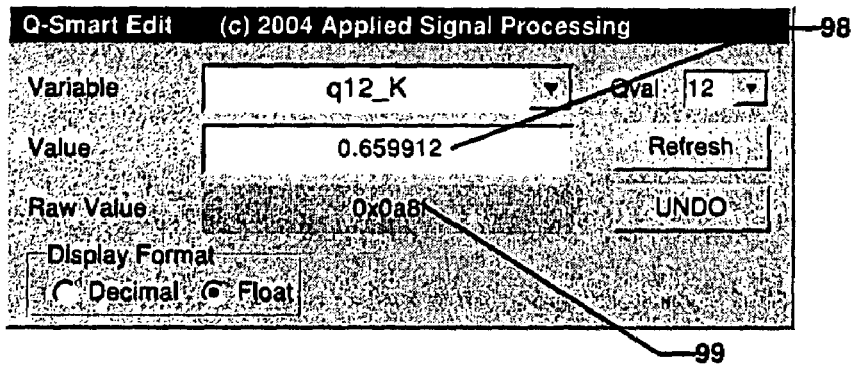

FIGS. 17c and 17d show the behavior of the window 70 when the user is changing the value of the variable. In the example shown, the user changes the value of q12_K from its present value of 0.488281 (FIG. 17b) to a new value of 0.66. FIG. 17c shows the Gui after the user has double clicked on the value field an has typed the value 0.66 and is just about to hit the "enter" key. After pressing the enter key, an entered value (see 100) is submitted to the Gui. FIG. 17*d* shows the state of the Smart Edit Gui after the user has entered the value of 0.66 and the logic of the OnNewFloatValueEntered ( ) function (see FIG. 18) has been executed. Note that a new displayed value (see 98) is shown as 0.659912 and a new raw value (see 99) is shown as (0x0a8f). Given the limitations of the accuracy of the selected Q-type, the interpreted value (after recalculation) and the entered value may not match exactly.

In some embodiments, logic associated with window 70 implements the pseudo code of FIG. 18. In FIG. 18, the OnNewFloatValueEntered( ) function performs three main tasks: (1) converts floating point entry into an equivalent raw value with saturation protection (note that the A symbol means "raised to the power"), (2) writes that new raw value to the variable on the target application, and (3) updates the value display field to reflect the accuracy of the Q-type representation of the desired new value.

Lines 20 to 33 within the OnNewFloatValueEntered ( ) function provide saturation protection of the entered value (see 100 in FIG. 17*c*). In other words, if the user tries to enter a value that is too large (in either the positive or negative direction) to be properly represented by a variable of the given Q-type, the function assigns the largest possible value (or most negative value for negative entries) to the variable. For example, with a 16 bit integer it will saturate the raw value at either 0x7fff or 0x8000. The operation GetNumBitsofNativeType( ) looks in a symbol table to get the size, in bits, of the raw type of the variable that is to be modified. For example, suppose the Q-type is 15 and the raw type is a 16 bit signed integer. The largest values that can be represented are +1-1.0. If the user enters the value of −1.2, the function will saturate the value to (−1.0) which is a raw value of (0x8000).

At line 40, the function WriteValueToTarget( ) uses available means to write a raw value to a specific memory location, typically on the target hardware over an interface. In most cases, the software will call a specific API to a standard debugging tool or ActiveX control to write the value a specific memory location or variable name. The MemAddress( ) function retrieves the address of the variable that is to be modified from the standard symbol table.

In some embodiments, prior to executing the OnNewFloatValueEntered( ), the Q-Smart Edit Gui detects the format of the entered value (505) and only executes the floating point to Q-type conversion for floating point entries. For other entry formats, such as decimal or hexadecimal, the entered value is assumed to be the raw value itself and the entered value is written directly to the target application. For example, if the user enters the value '3000', then logic associated with window 70 writes the raw value of 3000 to the target and then updates the value display and raw value display fields.

In FIGS. 14 and 17, whenever the user changes the Q-value field (74), the associated Q-value for the variable or expression (78) is updated within the session Q-object file, the display value is recalculated accordingly, and the value display field (76) is updated.

Figure 19:
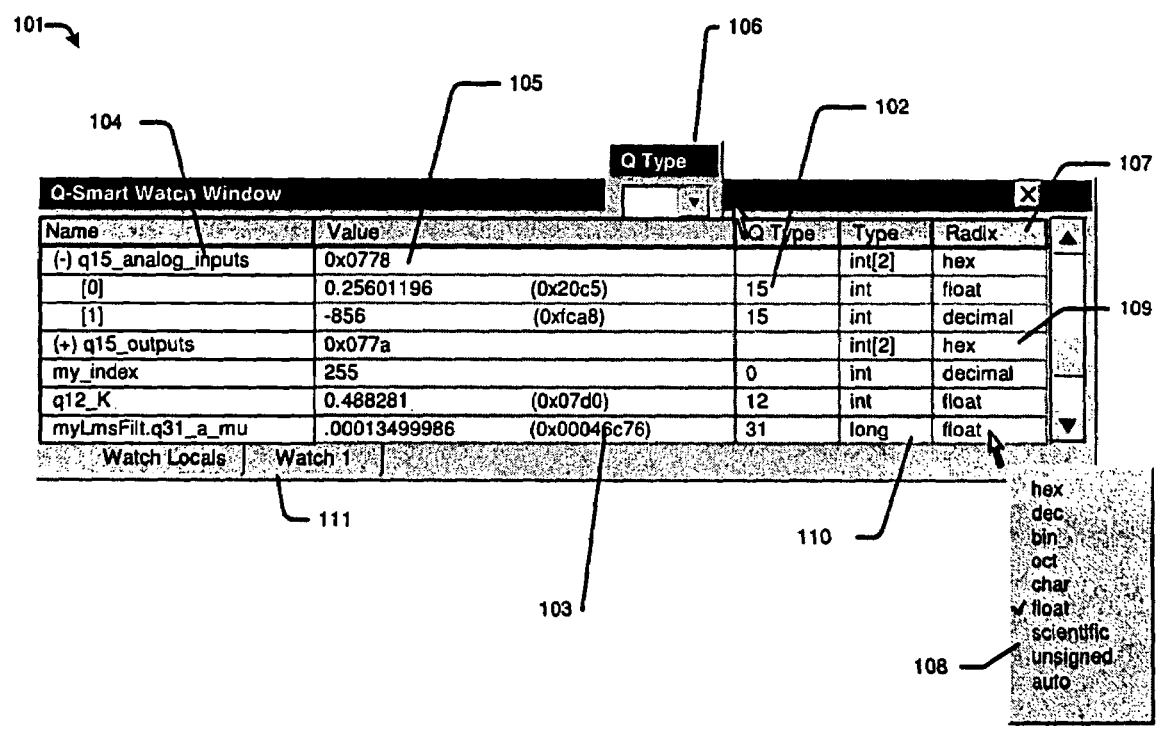
FIG. 19 is a screen display showing a "watch" window in one embodiment.

FIG. 19 is a screen display showing a watch window or Q-Smart™ watch window 101 that displays one or more variables interpreted as a Q-type. This particular embodiment has an appearance similar to the "watch window" in Texas Instruments Code Composer Studio debugging environment, with the addition of a Q-type edit/display field (102) and a raw value display field (103). The watch window 101 offers the ability to view and edit several variables within the same window.

A variable name/expression edit field (104) is used to display the name of the variable or expression to view and/or modify. A value edit/display field (105) shows the current value of the variable or expression in the selected display format, and also allows the user to enter new values for the variable. (The float display format and decimal display format operate in FIG. 19 in a manner similar to that in FIG. 14.) A Q-type dropdown/edit box (106) allows the user to manually select the Q-type for the selected rows of the watch window. A Q-type select edit/display field (102) shows the Q-type of the variable or expression in a particular row, and allows user to manually change the Q-type of the variable being displayed in that row. A display format select button (107) brings up a display format pop-up menu (108) to set the display format of the selected rows. A display format field (109) shows the current display format for a given row. A raw or native type display field (110) displays the raw or native type of the variable or expression of a given row. The display format pop-up menu (108) selects the display format of the value edit/display field for a particular row or selected set of rows. The raw value display field (103) shows the raw or native value of the variable in hexadecimal format. The tab sheet selector (111) selects which tab or sheet to bring to the front of the view.

In the embodiment shown in FIG. 19, left-clicking the display format field (109) (after a row is selected) brings up a display format pop up menu 108. Clicking on "Radix" push button (107) brings up the display format pop up menu 108 and can be used to set the display format for all selected rows. The value edit/display field (105) shows the interpreted value of the variable in the format set by the display format (Radix) and also shows the raw hex value in parenthesis (and/or grey). The field 105 may alternatively show the raw value in its own column. "Tree node" functionality may be used, particularly in field 104, to expand and collapse arrays and structures. When a new variable or expression is entered in the variable name field (104), the Q-type select edit/display field (102) is automatically set based on logic that attempts to determine the Q-type for the entered variable or expression, such as in any manner described in this disclosure. Double-clicking on the Q-type edit/display field (102) allows the user to change the Q-type manually. Single clicking on the "Q-Type" button brings up the "Q-type dropdown/edit box" (106). This manually sets the Q-type of all selected rows. The user double clicks the variable name edit field (104) to add/change a new variable or expression. A new expression is typically added to a blank row, which is normally available by scrolling to the end or bottom of the list shown in FIG. 19. A double click on the value within the value edit/display field (105) allows user to edit/change the value assigned to the associated variable. The window of FIG. 19 may also employ "auto complete" functionality (with an "auto suggest" dropdown list) on variable names using a symbol table as a base.

When the Q-value of a particular variable or expression is manually changed, the association between the variable name and the new Q value is saved into the session Q-object file. As variables and valid expressions are added, they get added to the session workspace file (91 in FIG. 13). New valid expressions are added to the Auto Complete list and added to the session Q-object file. The window of FIG. 19 may also automatically refresh the value field (105) when the associated target debugger halts (i.e., hits a break point). The current state of the window 19 may also be saved/recalled into the session workspace file (see 91).

In some embodiments, each row of the Q-Smart™ Watch Window shown in FIG. 19 has much of the functionality or replicates the functionality of the window described in connection with FIG. 14. The operations described in connection with FIG. 14, including entering new variables or expressions, changing the variable value and/or manually changing the Q-type may also apply to the Q-Smart™ Watch Window.

Figure 20:
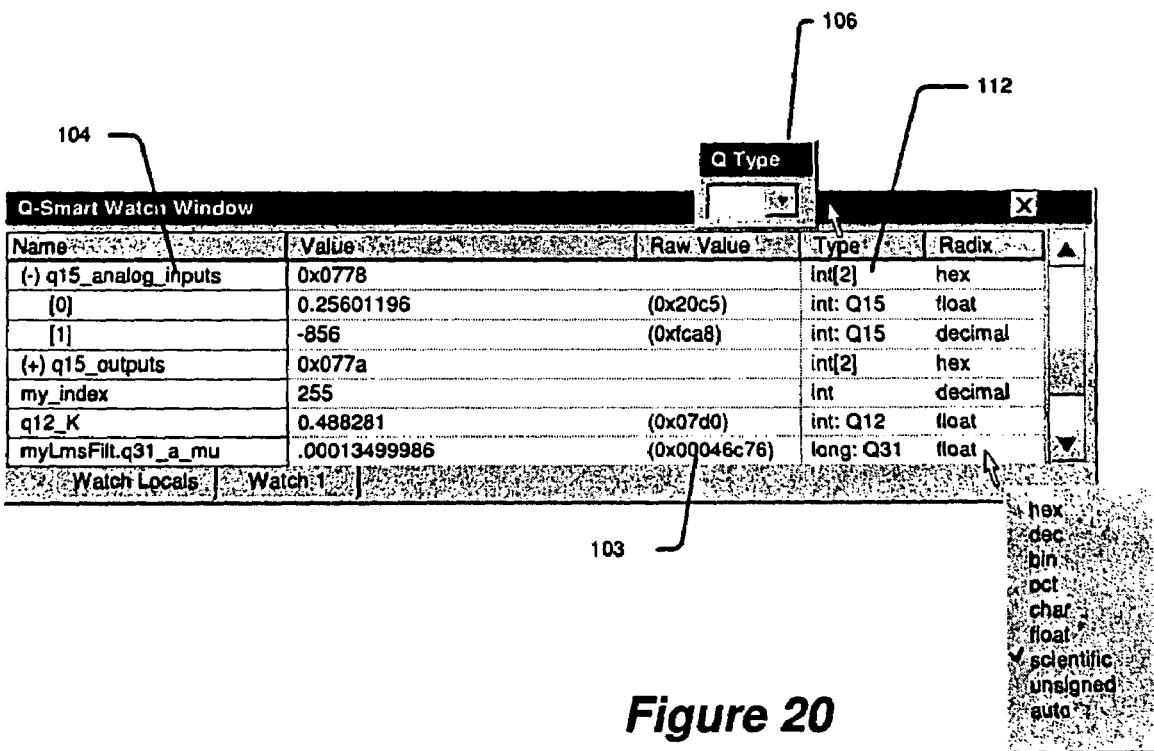
FIG. 20 shows an alternate styling of the "watch" window of FIG. 19.

FIG. 20 shows an alternative styling of the Q-Smart™ Watch Window. The Q-type display field (102) and raw or native type display field (110) of FIG. 19 are combined into a raw type and Q-type display field (112) in FIG. 20. In this embodiment, the Q-type is changed through the use of the Q-type dropdown/edit box (106). In the embodiment of FIG. 20, the raw value field (103) is in its own column. The functionality of this alternately styled Q-Smart™ Watch Window may otherwise act in a manner similar to that described in connection with FIG. 19.

Referring to FIG. 13, the Q-type compiler tool (62) creates Q-type object files (68), including a merged Q-type object file (69) that the watch/edit tool (61) can load at startup to thereby obtain an initial variable name to Q-type association. The Q-type compiler tool 62 can, in some embodiments, create Q-object files and perform a number of operations involving Q-object files. For example, it may load an existing Q-object file and allow the user to modify the Q-type associated with the variables within the Q-object file. It may also load the symbol table (8) from the target object file (7), and allow the user to manually assign the Q-type of symbols within the symbol table. It may also use the Q-type preprocessor (63) to scan a source file to identify the Q-types of all variables declared within that source file. The compiler tool 62 may also use the Q-type preprocessor (63) to scan all target application project source files to identify the Q-types of all target application variables. The compiler tool 62 may also be capable of loading and merging individual Q-type object files. Depending on the implementation, the compiler tool 62 may be capable of performing any or all of such operations.

In some embodiments, the Q-type compiler automatically creates the global Q-type object file for the user. One method of creating the global Q-object file is to use the Q-type preprocessor to scan all project files. In FIG. 13, the project file list (67) provides the list of all project source files (5) used to create the target application 4. The Q-type preprocessor 63 uses the Q-typedef qualifier list (66) to identify source code Q-type qualifiers to associate with a given Q-type. Q-type qualifiers are type definitions or structure definitions or enums that associate a virtual Q-type with a raw type, as shown in the C code fragment used by Applied Signal Processing in FIG. 21. In the case of C++, the qualifiers may be the names of typedefs, structures, or class definitions to associate with a Q-type. Similar techniques may be used for other development languages (including Java, BASIC, C#, as well as others).

The Q-type compiler lets the user maintain and assign his or her own virtual type (Q-type) qualifiers and their associated Q-type value, so that the user doesn't have to use any particular naming convention or Q-type qualifiers. This may make the Q-type preprocessor 63 more flexible with existing code and other programming styles and conventions. For example, a software developer may have used "typedef int_q15" to define the virtual type for 16-bit q15 type values. The Q-type compiler lets that developer also associate the string "int_q15" with the Q-type value of 15. This association can be maintained within the Q-typedef qualifier list.

Figure 30:
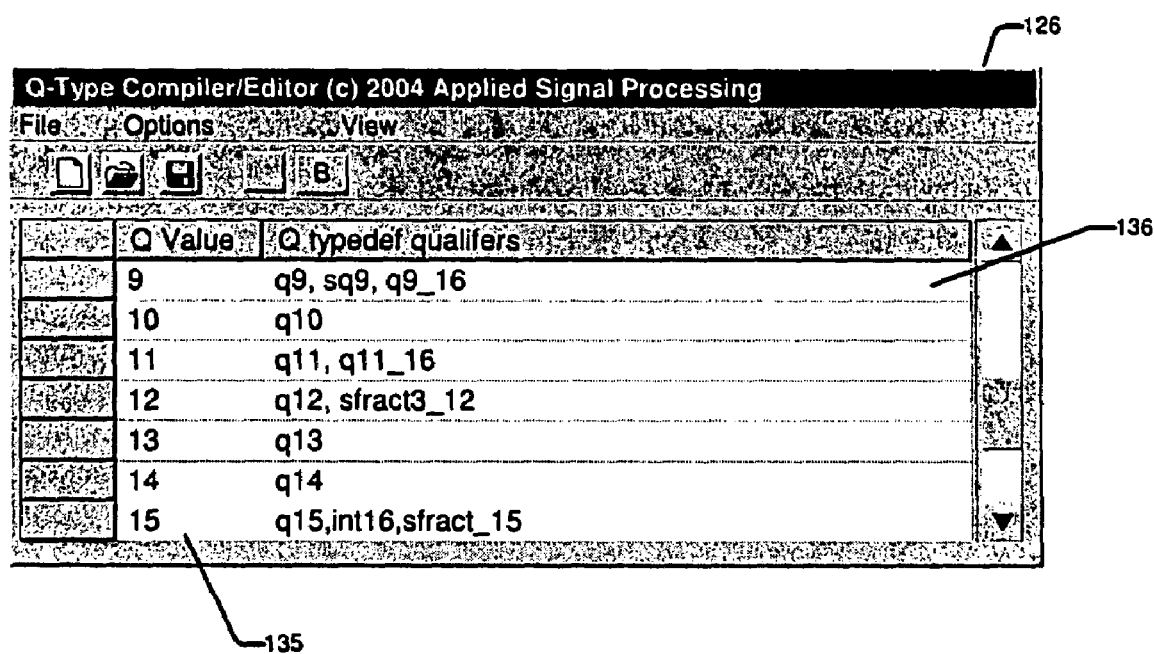
FIG. 30 is a screen display showing a window that displays information that may be stored in a Q-typedef qualifier list.

The Q-typedef qualifier list can operate as a list of all the typedef strings to associate with a given Q-type. A portion of an example Q-typedef qualifier list is shown in FIG. 22, and is also represented in the window of FIG. 30. The first value in each line is the Q value, followed by all the typedef qualifiers to associate with that Q value. See the Q-typedef qualifier list of FIG. 22.

In some programming approaches, a #define macro is used to define a default or "global Q" value for certain variable types. (For example, Texas Instruments "IQMath support Library", uses a #define GLOBAL_Q macro to define the default Q to assign to variables using the _iq typedef.)

The Q-type preprocessor 63 and compile tool may be configured to support such an approach. For example, the Q-type preprocessor 63 may permit #defines within the source code to determine a default Q value to assign to variable declarations that are of a "generic" Q-type. Within the Q-typedef qualifier list, a #define keyword macro string 144 is identified and followed by the typedefs 145 to associate with that keyword. When these typedefs are encountered, the Q-type value last defined by the keyword macro is assigned to the variable of this type. These virtual types may be called "compile time dynamic virtual types" because they allow source code to change the virtual type or Q-type associated with variable types.

This method may be best explained with an example. Suppose we have the Q-typedef qualifier list of FIG. 22 and the C code fragment shown in FIG. 23. After the Q-type preprocessor scans the code fragment of FIG. 23, the variable name and Q-type association shown in FIG. 24 is added to the Q-object file. Note that in FIG. 24, the Q-type preprocessor correctly identifies and remembers the proper Q-type of the variable g_var_3 whose associated default Q value macro was changed midstream within the file. (This may be considered an advantage over TI's use of the "global Q" variable approach as disclosed in the IQ math users guide). Also note that the q14_by_name variable was assigned the Q-value of 14 based on its name, even though it was not declared with a Q-typedef qualifier.

Figure 25:
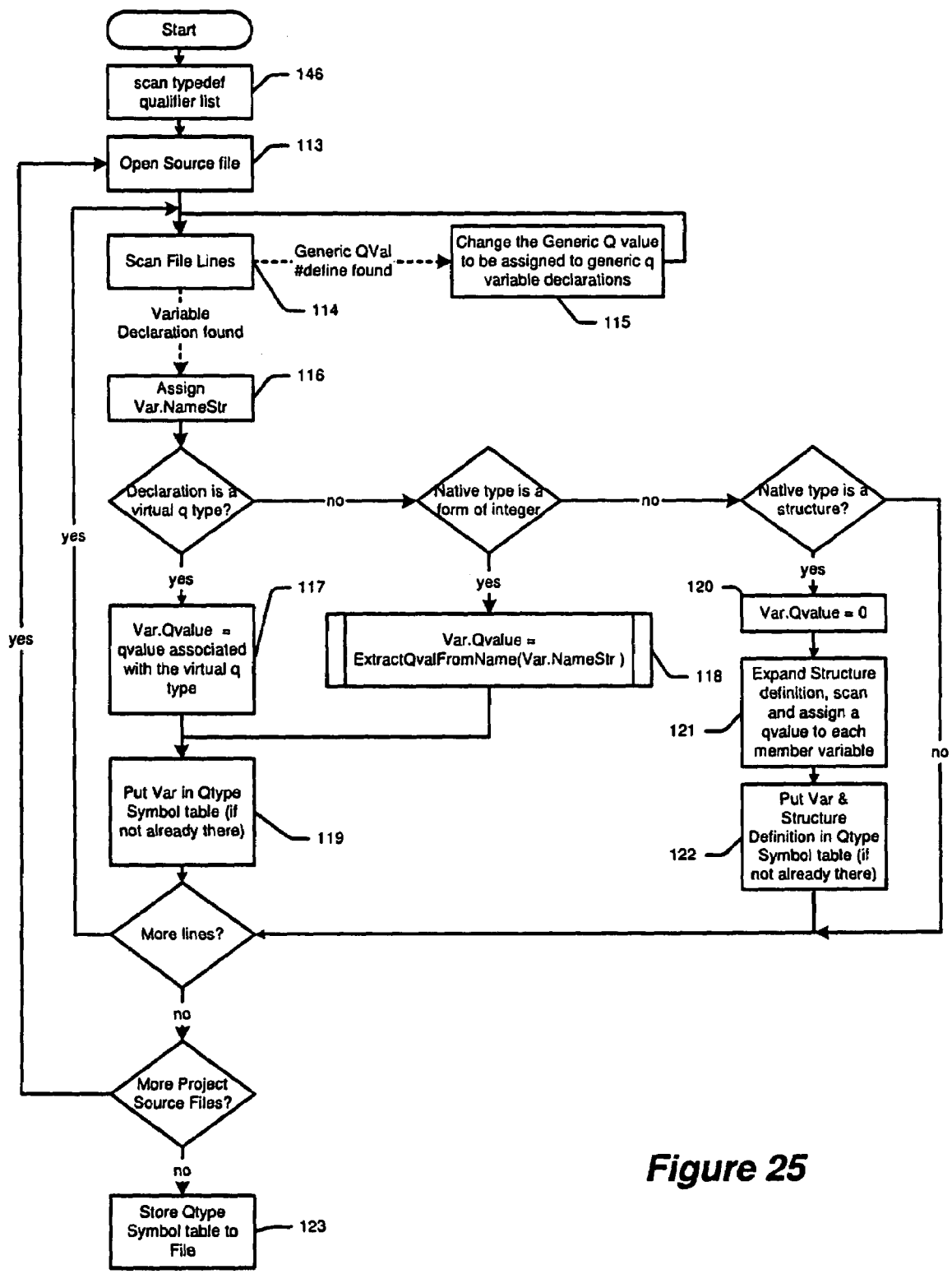
FIG. 25 is a flow chart illustrating the operation of one embodiment of the "build all" operation.

FIG. 25 is a flow chart illustrating the operation in one embodiment of a "build all" operation performed by the of the Q-type compiler 62. In this embodiment, the Q-type Q-type preprocessor 63 scans each project source file and generates a combined Q-object file.

In an alternate embodiment, the Q-type preprocessor may process individual project source files to generate individual Q-object files for each source file. The resulting individual Q-object files may then be merged to create a merged Q-object file. The merge operation builds a merged or accumulative Q-type symbol table by adding the symbols from each file to the merged Q-type symbol table, providing that the symbol does not already exist in the merged symbol table. This approach may not require re-scanning all project source files each time the "build all" operation is executed, only those source files that have changed since the last build of the global symbol table.

Referring to FIG. 25, note that in some embodiments, the typedef qualifier list is scanned 146 (the qualifier list may be different for different projects) early in the process. Thereafter, each source file is opened 113 and the lines of the file are scanned 114. If a generic Qval #define macro is found, the Q value to be assigned to variables declared using type definitions associated with that #define macro is updated 115. When a variable declaration is found, the name of that variable is assigned to the field "NameStr" of the Var structure 116. If the declaration is a virtual Q-type based on the Q-typedef qualifier list 66, its Qval is assigned (117) based on the Q value specified in the Q-typedef qualifier list 66. Otherwise, if the native or raw type of the variable is an integer, the Qvalue for the variable is determined by the process 118, or, it could be assigned to a default value. In either case, the Q-type associated with the variable is stored in a symbol table 119. If the native or raw type is a structure, each element of the structure is processed (120,121,122) in a similar manner. After each line of each source file is processed, the symbol table is stored in a file 123.

In some embodiments, a Q-type compiler operation, such as that illustrated in FIG. 25, is called automatically by the standard build tools after each source file is compiled and then the global build/merge operation is called after the standard tools build the ".out" or other target executable file, so that global symbol table is built seamlessly without any extra steps required by the user. The "build all"/merge operation can also be executed as a separate step through a menu option or toolbar button. Alternatively, the "build all" operation can be called by the tools as a separate step before or after the standard build process.

In a variation of this approach, the merge and "build all" operations are also available as part of the watch/edit tool and global Q-type object files are created from the individual Q-type object files that were created by individual calls to the Q-type preprocessor.

In some embodiments, the Q-object files 68 and 69 of FIG. 13 contain at least two symbol table sections, a "dynamic" section 124 and a "static" section 125. See the embodiment shown in FIG. 26. The static section 125 is the section created by the Q-type compiler tool. The dynamic section 124 contains a list of any new variable names or expressions that were manually added to the session Q-object file through the use of the watch/edit tool 61 when the user either entered a variable name that was not found in the static section 125 or when the user used the watch/edit tool to manually override the Q value assigned to a variable by the auto Q sense operation. The "Auto Q-Sense" operation (see an example in FIG. 15) will first scan for variables and expressions within the dynamic section and then the static section, allowing changes initiated during watch/edit sessions to be remembered. The "build all" and merge operations of the Q-type compiler 62 will keep the dynamic section in tact, only removing entries from the dynamic section if they match that same entry in the static section in both variable name and Q-type. In this manner, the tool remembers and tracks previous manual Q-type overrides and expressions, even after rebuilding the global Q-type object file.

Figure 27:
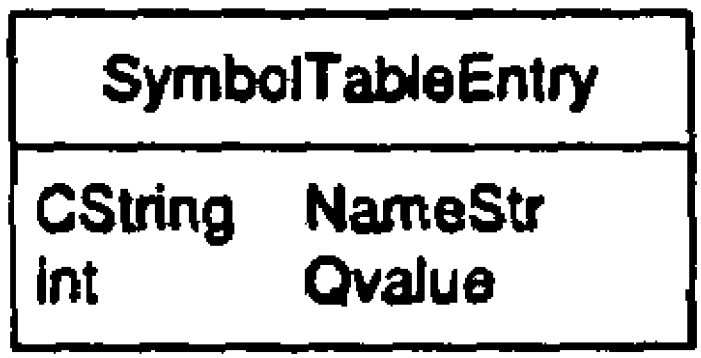
FIG. 27 is structure that might be used in a Q-object file.

In some embodiments, each symbol table entry may have a number of fields, including a field for storing the name of the variable, and another for storing the Qvalue associated with that variable. See the structure illustrated in FIG. 27.

FIG. 28 is a pseudo code listing that illustrates various symbol table management operations when performing three functions. For the first function shown, listed are the operations carried out when a "build all" operation is performed. For the second function shown, listed are the operations performed when a new expression is entered in the watch/edit tool 61. And for the third function shown in FIG. 28, listed are the operations performed when a change to a Q-type for a particular variable are listed.

In some embodiments, it may be preferable to integrate the Q-type object and/or symbol table files 68 and 69 or portions thereof in FIG. 13 with other files or objects within the Q-type support environment. For example, the Q-object files may be integrated with or within the symbol table 8 generated by the build tools 6, or with/within one of the other files generated by the build tools 6. Also, in some embodiments, some or all of the aspects of the debugging tool 58 may be integrated into the build tools 6 so that the build tools partially or fully incorporate the functionality of the debugging tool 58. For example, the Texas Instruments Code Composer Studio could be modified to incorporate some or all of the functionality disclosed in this application.

Figure 29:
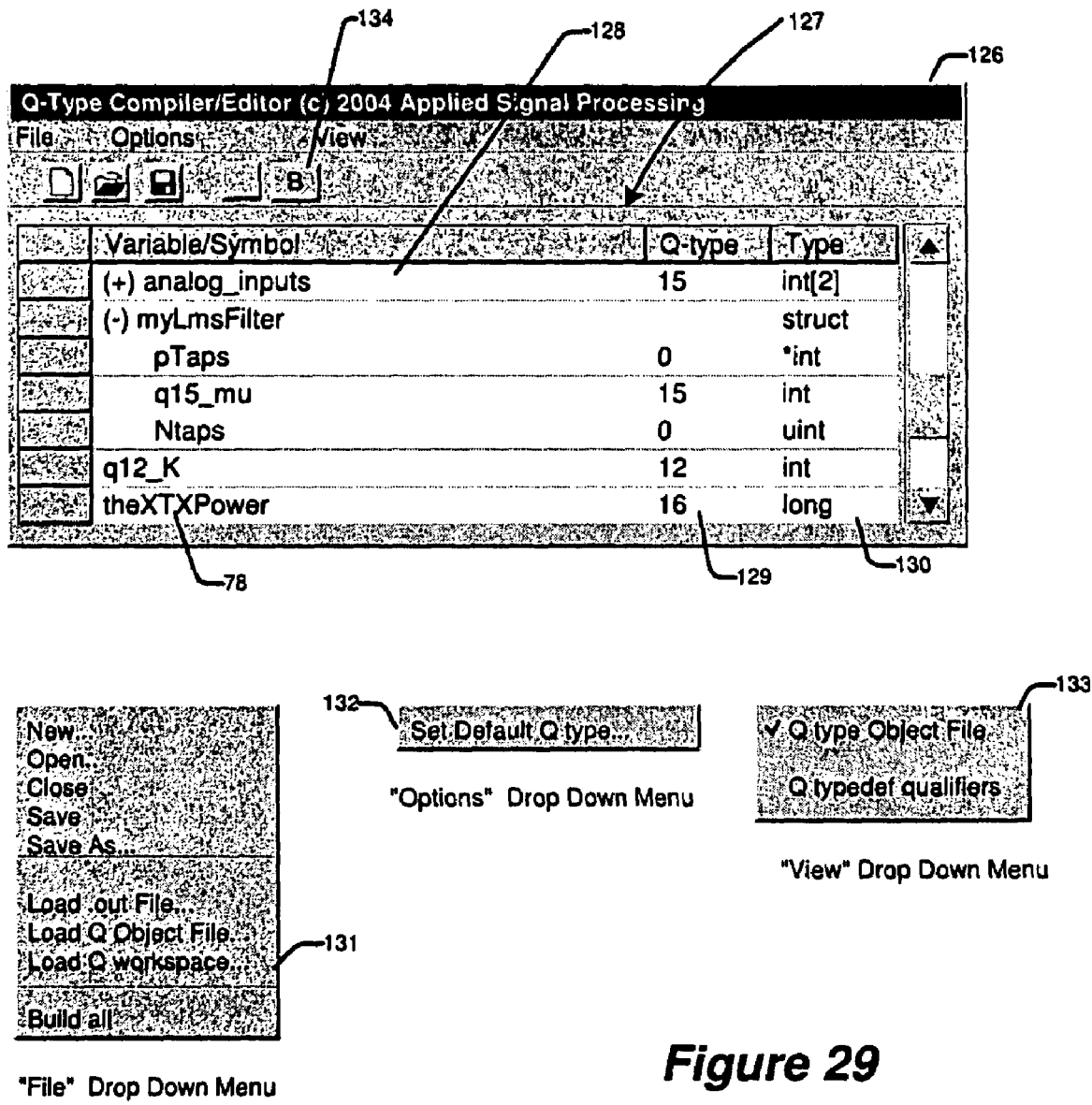
FIG. 29 is a screen display showing a window that displays information that may be stored in a Q-object file.

FIGS. 29 and 30 are screen displays showing a Q-type compiler/editor user interface. In the embodiment illustrated in FIGS. 29 and 30, the window 126 can alternatively display Q-object files, as shown in FIG. 29, and Q-typedef qualifier files, as shown in FIG. 30. In other embodiments, some or all of the information displayed in FIGS. 29 and 30 may be displayed in independent windows.)

FIG. 29 displays information stored in a Q-object file. The Q-object file includes variable names, their assigned Q-type, and their raw type, as shown in FIG. 29. Table display area (127) shows the contents of the current Q-object or Q-typedef qualifier list depending on the currently selected view. Variable name display field (128) shows the name of the variables found in the current Q-type object file or symbol table. Q-type edit/display field (129) shows the Q-type of the variable in a particular row, and allows user to manually change the Q-type of that variable. Raw or native type display field (130) displays the native or raw type of the variable.

A "File" dropdown menu (131) provides various options for creating, loading and saving Q-object file and symbol tables, and provides access to the build all operation. An "Options" dropdown menu (132) allows the user to set the default Q-type to assign variables during the "build all" operation. A View dropdown menu (133) allows the user to toggle between "Object File View" (FIG. 29) and "Typedef Qualifier View" (FIG. 30). The "build all" push button (134) initiates the build all operation.

The Q-type compiler/editor shown in FIG. 29 allows users to create/view/modify and save a Q-type object file. Once a Q-type object file is loaded, the user can inspect/modify the variable name and Q value assignment. The File/New menu option sets a new Q-type object file name to be saved. The File/Open menu option opens an existing Q-type object file or session workspace The File/Save menu option saves the current file. The File/Load out File menu option loads a COFF ".out" file (symbol table only), extracts the Q value from the variable name while assigning default Q value to names without a q?? substring, and updates the table display area. The File/Load Q-object File menu option loads an existing Q-type object file and updates the table display area. The contents of the loaded file can be optionally merged or added to the Q-type object file which is already opened. The File/Load Q workspace option loads the state of a previous Q-type compile session. The File/Compile-Build option all initiates the build all operation, such as in the manner previously described, and loads the resulting Q-type object file into the workspace.

The Options/Set Default Q-type menu option chooses the Q-type to be assigned when a variable is declared without using a Q-typedef qualifier or when the variable does not contain the 'q??' substring. The View/Q-type Object File menu option sets the view to Q-object File view (FIG. 29) in which the contents of the object File (variable name, Q-type and raw type) are shown in the table display area as shown in FIG. 29. The View/Q-Typedef Qualifiers menu option sets the view to Q-Typedef Qualifier View, in which the current Q-typedef qualifier list is shown in the table display area as shown in FIG. 30.

FIG. 30 is a screen display showing the window 126 displaying the Q-typedef qualifier view. In this view, the user can view and modify the Q-typedef qualifier list. A Q value display field (135) shows the Q-type value to which the Q-typedef qualifiers will be assigned. This field will also show the #define symbol macros that will define the default Q value (as described by the Q-type preprocessor operation). The Q-typedef qualifier edit/display field 136 shows the current list of typedefs to associate with a given Q-type value, each typedef separated by commas. The list can also be maintained and modified using a text file and text editor.

In the view shown in FIG. 30, the Q-type compiler window 126 allows the user to view or modify (and save) the current typedef qualifier to Q value associations that the Q-type preprocessor uses when scanning source files and building a Q-type object file. The Q value fields 135 show the Q value that will be assigned to a variable declared using the typedef qualifier in the associated row. The Q-typedef qualifiers are strings separated by commas or spaces. These are the strings that match the typedefs found within the users' source code when he or she declares variables of a virtual Q-type. (See FIG. 21). For example, given the Q-typedef qualifier list of FIG. 30, when the Q-type preprocessor finds a line such as "q10 myVariable" within a source file, it will assign the symbol myVariable a Q value of 10. Note that in this embodiment, the variable name need not have "q10" substring within it. The Q-typedef qualifier list can be saved to a file associated with a particular project and file list.

Figure 31:
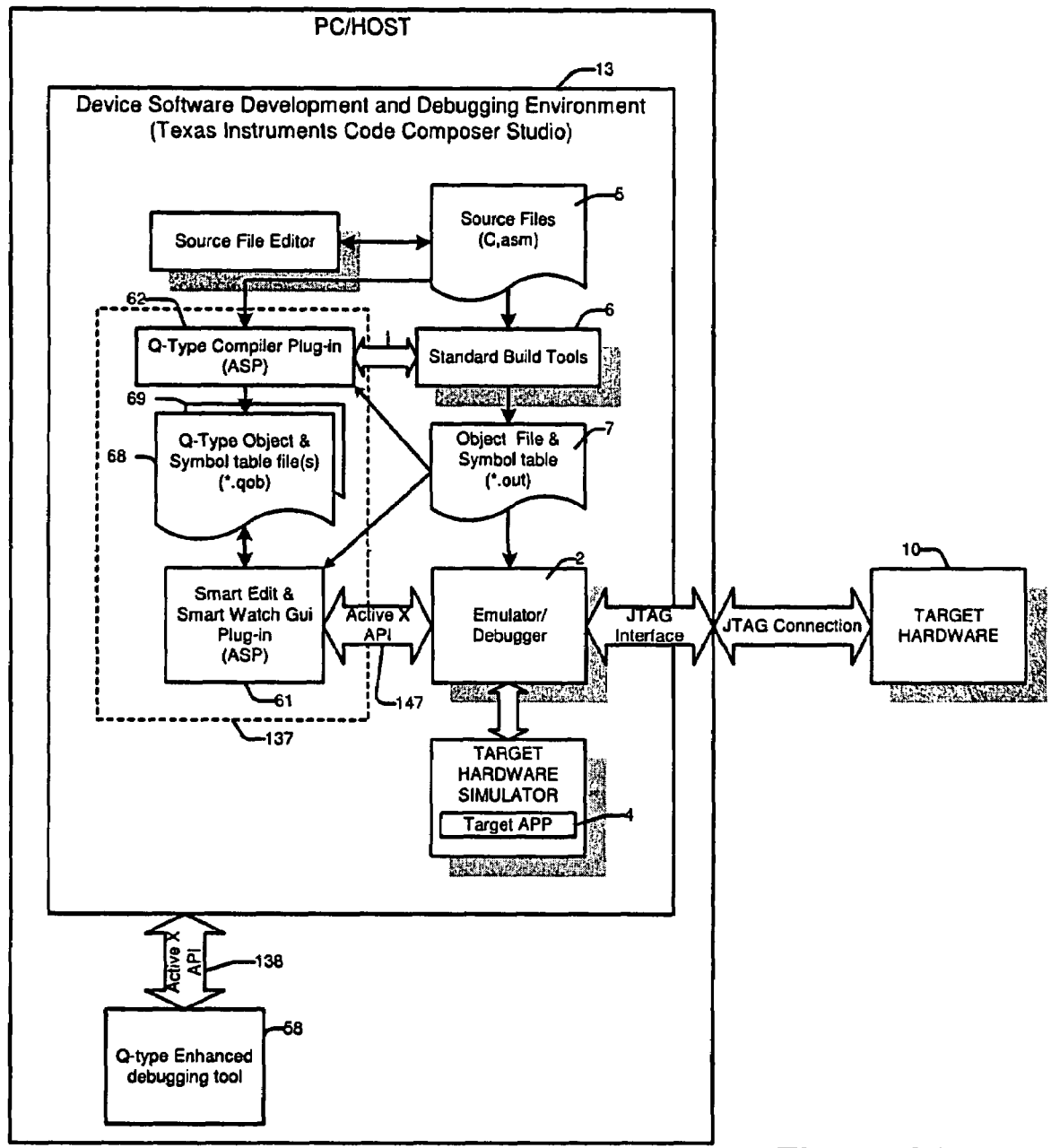
FIG. 31 is a block diagram of a Q-type support environment designed for operation in connection with a development environment.

FIG. 31 is a block diagram of a Q-type support environment designed for operation in connection with a development environment. Some development environments support a programming interface that allows programmers to develop applications that control, modify, automate, and/or plug into the development environment or other software. See, e.g., Chappell, Understanding ActiveX and OLE (Microsoft Press 1996), Denning, OLE Controls Inside Out (Microsoft Press 1995), Brockschmidt, Inside OLE (2d ed. Microsoft Press 1995), and Siegel, CORBA Fundamentals and Programming (John Wiley & Sons 1996). All of these references are hereby fully incorporated by reference.

In FIG. 31, the Q-type support environment is shown operating in connection with Texas Instruments' Code Composer Studio environment. Texas Instruments Code Composer Studio (CCS) supports an ActiveX interface which allows other Windows client applications to get access to the emulation environment and target application data. Texas Instruments Code Composer Studio also supports an open architecture which allows third parties to create "plug-ins" which can expand the functionality of CCS. The client applications are launched separately, normally like any windows program. The plug-ins are generally launched from the CCS environment and appear as if they are "part of the program."

FIG. 31 shows an embodiment in which a debugging tool is integrated as either an active X plug-in 137 or a stand alone client application 58 working in conjunction with an environment such as Texas Instruments' Code Composer Studio. The debugging tool 58 or 137 interfaces with the CCS or other environment over the ActiveX interface 138 or 147. This interface allows the debugging tool to retrieve a list and location of the target application project files, project directories, search directories, and project source files. The debugging tools 58 or 137 may be notified of certain events by the CCS over the ActiveX interface, which may then allow the debugging tools 58 or 137 to perform certain tasks at appropriate times. For example, the debugging tools 58 or 137 may automatically call the C processor after a source file is compiled, or automatically execute the Q-compiler's build all operation after a final target application executable file (*.out) has been built, or refresh the Q-type watch/edit tool's display when the target execution halts or when a variable or memory location contained within the watch/edit tool has changed, or save and recall the state, condition and settings of the Q-type debugging tool when the user performs a environment "workspace save" operation.

In addition, the ActiveX interface may allow the tools 58 or 137 to load target symbol table information from an executable object file, provide target symbol table information such as raw types, structure definitions, enums, size of structures etc, and provide the communication link to the target application so that the Q-Smart™ edit/watch tool can read and write variable and memory locations on the target application. The debugging tool 58 or 137 may use the interface 138 or 147 to evaluate C expressions and retrieve raw variable values from the target application, as well as other functions.

The ActiveX interface may provide options for modifying the environment's user interface, which could include the capability of providing menu items and toolbar pushbuttons within the environment (e.g., CCS environment) that open and/or execute components of the debugging tool 58 or 137 such as the Q-type compiler, Q-Smart™ Edit and Q-Smart™ Watch windows.

Figure 32:
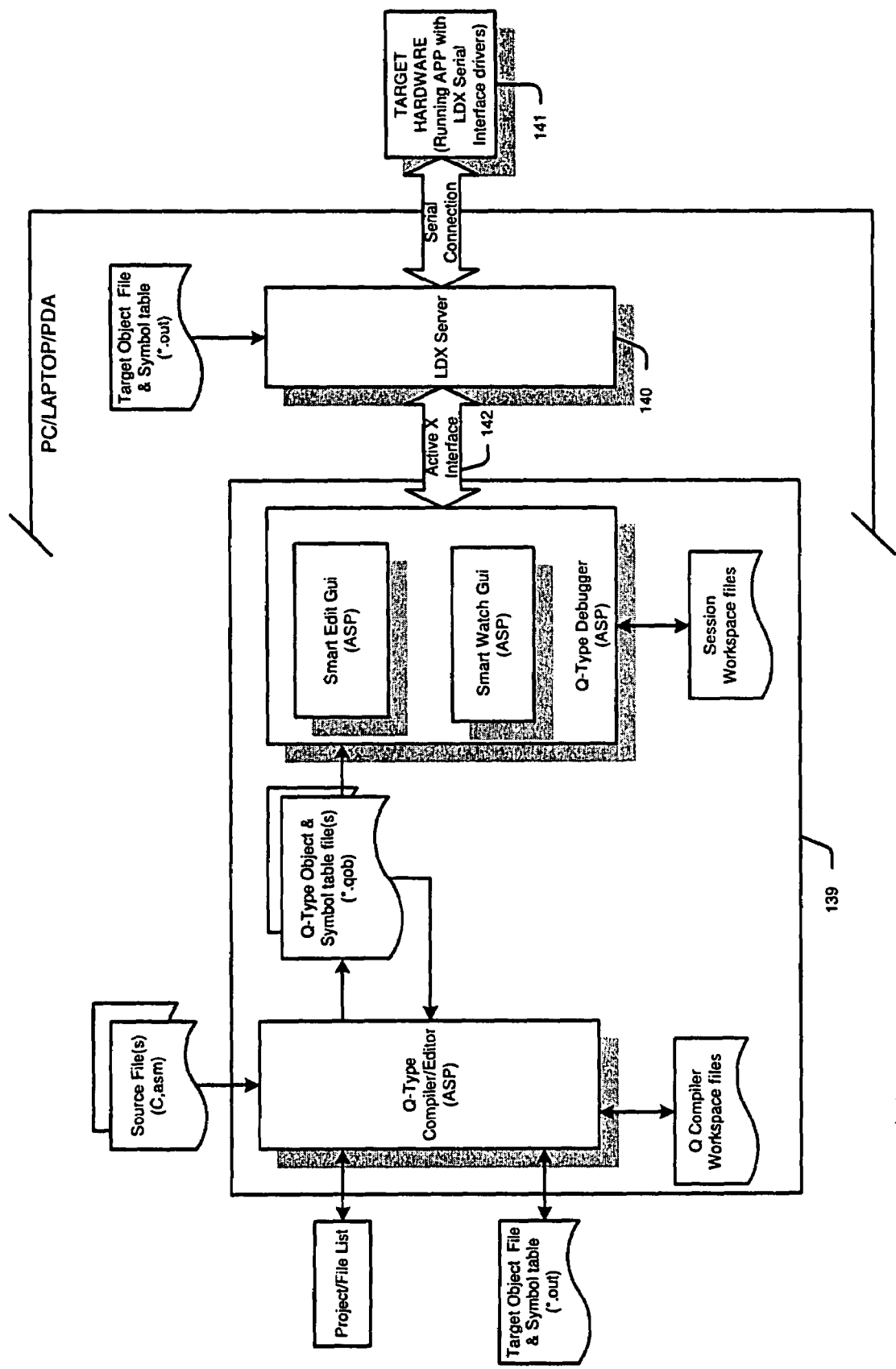
FIG. 32 is a block diagram of a software development environment where a Q-type support environment is used as a stand-alone client.

FIG. 32 is a block diagram of a software development environment where a Q-type edit/watch tool 139 is used as a stand-alone client. Such an embodiment may be implemented using Applied Signal Processing's Live Data Exchange (LDX™) system 140, which includes an ActiveX server which allows other windows client applications to view and modify variables and memory locations of a target application executing on target hardware 141. The debugging tool 139 uses the LDX ActiveX interface 142 to perform a variety of functions, including loading target symbol table information from an executable object file, and providing target symbol table information such as raw types, structure definitions, enums, size of structures etc. The interface 142 also provides the communication link to the target application so that the Q-Smart™ edit/watch tool can read and write raw values from and to variable and memory locations on the target application.

The Appendices contain listings of source files and executables for building and demonstrating one or more embodiments Appendix A (SmartWatchGui directory) is a list of files including the source files of a program that operates as an ActiveX plug-in to Texas Instruments' Code Composer Studio development environment. The ActiveX object must be registered using "regsvr32 Qsmartwa.ocx", prior to running CCS Studio. The plug-in was created in Visual C++v6.0 using Texas Instruments' Plug-in Software Development Kit Version 2.2.

Appendix B (CPreeCon directory) is a list of files including the source files and executable for a command line executable version of the Q-type Preprocessor. Its project space can be loaded using Microsoft Visual C++ Version 6.0.

Appendix C (QExample directory) contains an example DSP target application that contains variables of several Q types. The example was developed with Texas Instruments' Code Composer Studio version 2.21. CCS was configured with the "C55xx Simulator" board type, device driver Revision 03.05.09. The project space is QsenseExample.pjt, and the workspace is IQExample.wks.

It should be understood that the various techniques and features that have been described or otherwise disclosed herein can be implemented separately, combined with other techniques and features, or used in conjunction with each other. In other words, it is intended that the various techniques and features described in connection with implementations illustrated in the drawings, described or illustrated in the subject matter incorporated by reference, or otherwise disclosed can be used alone or can be combined with other techniques and/or features, even if such techniques and/or features are not shown being used as such.

The following references are hereby fully incorporated by reference:

(1) Code Composer Studio Software Developer's Kit User's Guide (Texas Instruments' literature number SPRU320);

(2) Code Composer Studio Application Programming Interface (API) Reference Guide (Texas Instruments' literature number SPRU321);

(3) IQ Math Library (A Virtual Floating Point Engine), Module User's Guide, C28x Foundation Software (Texas Instruments, version 1.4.1, June 2002);

(4) U.S. Pat. No. 6,553,502;
(5) U.S. Pat. No. 6,338,025;
(6) U.S. Pat. No. 5,941,991;
(7) U.S. Pat. No. 5,557,557;
(8) U.S. Pat. No. 6,543,048;
(9) U.S. Pat. No. 5,228,039;
(10) U.S. Pat. No. 5,479,652;
(11) U.S. Pat. No. 5,488,688;
(12) U.S. Pat. No. 5,590,354;
(13) U.S. Pat. No. 5,768,152;
(14) U.S. Pat. No. 5,771,240;
(15) U.S. Pat. No. 5,828,824;
(16) U.S. Pat. No. 5,884,023;
(17) U.S. Pat. No. 5,968,188;
(18) U.S. Pat. No. 6,041,406;
(19) U.S. Pat. No. 6,185,732;
(20) U.S. Pat. No. 6,249,909;
(21) U.S. Pat. No. 6,311,292;
(22) U.S. Pat. No. 6,493,868;
(23) U.S. Pat. No. 5,524,244;
(24) U.S. Pat. No. 5,933,641;
(25) U.S. Pat. No. 5,950,000;
(26) U.S. Pat. No. 5,983,017;
(27) U.S. Pat. No. 6,079,032; and
(28) U.S. Pat. No. 6,240,549.

Although embodiments have been principally described in the context of a software development and/or debugging environment, some embodiments of the present invention need not be limited to such a situation. The present invention may be applicable in other contexts, including the full range of hardware and software design, test, and emulation contexts, and in the context of logic analyzers, software simulators, and monitoring devices or software, and may also be applicable in other situations as well. Similarly, some aspects of the present invention have been described in connection with the C programming language, but it should be understood that some or all aspects of various inventions disclosed herein may apply to other languages, including BASIC, Java, C#, and C++, as well as other languages.

Generally, although the inventions disclosed herein have been shown and described with respect to specific embodiments and/or implementations, various changes and modifications, even if not shown or specifically described herein, may be applicable, and are deemed to lie within the spirit and scope of this disclosure. Any specific features or aspects of the embodiments or implementations described or illustrated herein, however, are not intended to limit the scope of any claimed invention in a manner not specifically and explicitly required by the claim directed to that invention.

What is claimed is:

1. A method of displaying information using a development tool in a software development environment, the method comprising the acts of:

determining a virtual type for each of a plurality of variables in a development project, each of the plurality of variables also having a native type, and where for each of the plurality of variables, the virtual type is interpreted differently than the native type;

storing associations between the plurality of variables and their determined virtual types;

providing a graphical user interface for displaying one or more of the variables in the development project, wherein the graphical user interface displays the interpreted value of information stored at a memory location associated with each of the one or more variables as determined by the virtual type associated with each of the one or more variables;

detecting that the user has interacted with the graphical user interface to change the virtual type associated with a displayed variable to a new virtual type;

in response to detecting that the user has interacted with the graphical user interface to change the virtual type associated with the displayed variable to the new virtual type, storing an association between the displayed variable and the new virtual type; and updating the graphical user interface to reflect the new interpretation of the information stored at the memory location associated with the displayed variable; and enabling the user to interact with the graphical user interface to change the information stored at the memory location associated with the displayed variable, where the information stored at the memory location associated with the displayed variable is changed by the user specifying a new value for the displayed variable as interpreted by its virtual type, thereby causing the information stored at the memory location associated with the displayed variable to be updated so that the displayed variable is interpreted according to its virtual type, the displayed information is consistent with the new value specified by the user.

2. The method of claim 1, further comprising the act of:

detecting that the user has interacted with the graphical user interface to change information stored at a memory location associated with a displayed variable, where the information stored at the memory location can be modified through the user specifying a new value for the displayed variable as it is to be interpreted in the virtual type associated with the displayed variable, and where the information stored at the memory location is stored so that when the stored information is interpreted according to its virtual type, the displayed variable has a value consistent with the new value specified by the user.

3. The method of claim 2, where the user specifies a new value for the displayed variable as a floating point value in the Q-type associated with the displayed variable.

4. The method of claim 1, where the new virtual type associated with the displayed variable is a Q-type having an associated Q value.

5. The method of claim 1, where the operation of providing a graphical user interface for displaying one or more of the variables in the development project includes the operation of:

displaying a watch window during a debug mode in the software development environment so that the value of the one or more variables can be monitored during debug execution of a computer program.

6. The method of claim 1, where the operation of determining a virtual type for each of a plurality of variables includes the operation of:

accepting input from the user specifying the appropriate virtual type for one of the plurality of variables.

7. The method of claim 1, where the one or more variables includes a Q-type variable, where the graphical user interface displays the floating point equivalent of the Q-type variable, and where more than one Q value is represented among a plurality of Q-type virtual types for the plurality of variables.

8. A computer that is operated by a user, where the computer is programmed to be capable of carrying out operations comprising:
    determining a virtual type for each of a plurality of variables in a development project, where each of the plurality of variables also has a native type that is interpreted differently than its virtual type;
    storing associations between the plurality of variables and the determined virtual types for each of the plurality of variables;
    providing a graphical user interface for displaying a first variable being used in the development project, where the graphical user interface displays information stored at a memory location associated with the first variable,
    where the information is displayed in a format that reflects the value of the information at the memory location as interpreted by the virtual type associated with the first variable;
    detecting that the user has interacted with the graphical user interface to change the virtual type associated a virtual type with a second variable;
    in response to detecting that the user has interacted with the graphical user interface to change the virtual type with the second variable, storing an association between the second variable and its virtual type; and
    updating the graphical user interface to reflect the new interpretation of the information stored at the memory location associated with the second variable according to the virtual type associated with the second variable; and
    enabling the user to interact with the graphical user interface to change the information stored at the memory location associated with the second variable, where the information stored at the memory location is changed by the user specifying a new value for the second variable as interpreted by the virtual type associated with the second variable, causing the information stored at the memory location to be updated so that when the information is interpreted according to its virtual type, the information has a value consistent with the new value specified by the user.

9. The computer of claim 8, where the virtual type associated with the first variable is a Q-type variable, and where the graphical user interface displays the floating point equivalent of the first variable.

10. The computer of claim 8, where the operation of enabling the user to interact with the graphical user interface to change the information stored at the memory location associated with the first variable includes the operation of:
    properly saturating the new value if it is beyond the mathematical range of the first variable's Q-type.

11. The computer of claim 8, where the graphical user interface simultaneously displays the information stored at the memory location associated with the first variable in a format showing the binary representation of the information stored at the memory location.

12. The computer of claim 8, where the
    user has associated a Q-type with the second variable that is displayed by the graphical user interface.

13. The computer of claim 8, where the operation of determining a virtual type for each of a plurality of variables includes the operation of:
    accepting input from the user specifying the appropriate virtual type for at least one of the plurality of variables.

14. The computer of claim 8, where the operation of determining a virtual type for each of a plurality of variables includes the operation of:
    automatically determining a virtual type for at least one of the plurality of variables by using a default virtual type that is associated with the native type associated with the at least one variable.

15. The computer of claim 8, where the operation of determining a virtual type for each of a plurality of variables includes the operation of:
    automatically determining a virtual type for at least one of the plurality of variables by evaluating the name of the at least one variable as used in the development environment.

16. The computer of claim 8, where the operation of determining a virtual type for each of a plurality of variables includes the operation of:
    automatically determining a virtual type for at least one of the plurality of variables by comparing the at least one variable's declared type to one or more typedef names that are mapped to a specific Q type.

17. The computer of claim 8, where the operation of determining a virtual type for each of a plurality of variables includes the operation of:
    automatically determining a virtual type for at least one of the plurality of variables by accessing stored type information in a file that contains debug information.

18. A data storage medium having computer program instructions stored on it, where the computer program instructions are executable on a computer that is operated by a user, and where the computer program instructions configure the computer to be capable of carrying out operations comprising:
    providing a development environment for a project having a plurality of variables associated with it, each of the variables having a native type, and where one or more of the variables has an associated virtual type;
    storing an association between a first variable and a virtual type associated with the first variable, where the first variable is one of the plurality of variables associated with the project;
    providing a graphical user interface for displaying in a window information stored at a memory location associated with the first variable in a format that reflects the information stored at the memory location associated with the first variable as interpreted by the virtual type associated with the first variable, rather than the native type of the first variable;
    detecting that the user has interacted with the window within the graphical user interface to associate a virtual type with a second variable;
    in response to detecting that the user has interacted with the window within the graphical user interface to associate a virtual type with the second variable, storing an association between the second variable and its virtual type;
    updating the displayed information in the window within the graphical user interface to reflect the interpretation of the information stored at a memory location associated with the second variable according to the virtual type associated with the second variable; and
    enabling the user to interact with the window within the graphical user interface to change the information stored at the memory location associated with the second variable, where the information stored at the memory location associated with the second variable is changed by the user specifying a new value for the second variable as interpreted by its virtual type, thereby causing the information stored at the memory location associated with the second variable to be updated so that when the second variable is interpreted according to its virtual type, the displayed information is consistent with the new value specified by the user.

19. The data storage medium of claim 18, where the development environment enables development of software for a processor that more efficiently processes fixed point operations than floating point operations, where the virtual type associated with the second variable is a Q-type variable, and where the window within the graphical user interface displays the floating point equivalent of the second variable.

20. The computer of claim 18, where the operation of storing an association between the first variable and the virtual type associated with the first variable includes the operation of:

accepting input from the user specifying the appropriate virtual type for the first variable.

* * * * *

UNITED STATES PATENT AND TRADEMARK OFFICE
CERTIFICATE OF CORRECTION

PATENT NO. : 7,434,205 B1  Page 1 of 1
APPLICATION NO. : 11/061113
DATED : October 7, 2008
INVENTOR(S) : Steenhagen et al.

It is certified that error appears in the above-identified patent and that said Letters Patent is hereby corrected as shown below:

Column 11, line 59, replace "searnlessly" with --seamlessly--.
Column 12, line 55, replace "dropdownledit" with --dropdown/edit--.
Column 13, line 34, replace "ExtractQvalFromnName()" with --ExtractQvalFromName()--.
Column 14, line 45, replace "substuing" with --substring--.
Column 18, line 7, replace "Ubrary" with --Library--.
Column 24, line 22, replace "; and" with --;--.
Column 24, line 34, replace "so that the displayed" with --so that when the displayed--.
Column 25, lines 27-28, replace "change the virtual type associated a virtual type" to --associate a virtual type--.
Column 25, line 30, replace "change the virtual type" to --associate a virtual type--.
Column 25, line 32, replace "; and" with --;--.
Column 25, line 33, replace "the new" with --an--.
Column 25, line 34, replace "the memory" with --a memory--.
Column 25, lines 66-67, delete "that is".

Signed and Sealed this

Third Day of November, 2009

David J. Kappos
*Director of the United States Patent and Trademark Office*